(12) United States Patent
Kowata et al.

(10) Patent No.: US 6,641,853 B1
(45) Date of Patent: Nov. 4, 2003

(54) INHIBITORY AGENT FOR PROTEIN DENATURATION, KNEADED MEAT WITH SUPPRESSED FREEZING-DENATURATION, PROCESS THEREOF, AND PROCESS OF FISH AND MEAT PASTE PRODUCTS

(75) Inventors: Teruo Kowata, Sendai (JP); Mitsutake Sato, Sendai (JP); Takeo Shimomura, Sendai (JP); Masami Yamashita, Sendai (JP)

(73) Assignees: Kabushiki Kaisha Hayashibara Seibutsu Kagaku Kenyuojo (JP); Aoba Kasei Kabushiki Kaisha (JP)

( * ) Notice: Subject to any disclaimer, the term of this patent is extended or adjusted under 35 U.S.C. 154(b) by 0 days.

(21) Appl. No.: 09/480,451

(22) Filed: Jan. 10, 2000

(30) Foreign Application Priority Data

Jan. 11, 1999 (JP) ................................ 11-4610
Oct. 29, 1999 (JP) ............................ 11-307975

(51) Int. Cl.[7] ............................ A23B 4/20; A23B 4/24; A23L 1/314
(52) U.S. Cl. ....................... 426/332; 426/652
(58) Field of Search .................. 426/332, 652

(56) References Cited

U.S. PATENT DOCUMENTS

| | | | |
|---|---|---|---|
| 4,009,288 A | * 2/1977 | Fukagawa | 426/297 |
| 4,230,735 A | * 10/1980 | Yoshida et al. | 426/557 |
| 4,342,790 A | * 8/1982 | Katoh et al. | 426/332 |
| 4,430,356 A | * 2/1984 | Ohyabu et al. | 426/574 |

FOREIGN PATENT DOCUMENTS

| | | | |
|---|---|---|---|
| EP | 000788791 A1 | * | 8/1997 |
| JP | 55081570 A | * | 6/1980 |
| JP | 7-135927 | | 5/1995 |
| JP | 7-143876 | | 6/1995 |
| JP | 7-170977 | | 7/1995 |
| JP | 7-213283 | | 8/1995 |
| JP | 7-298880 | | 11/1995 |
| JP | 7-322883 | | 12/1995 |
| JP | 8-263 | | 1/1996 |
| JP | 8-9931 | | 1/1996 |
| JP | 8-66187 | | 3/1996 |
| JP | 8-66188 | | 3/1996 |
| JP | 8-84586 | | 4/1996 |
| JP | 8-149980 | | 6/1996 |
| JP | 8-336388 | | 12/1996 |
| JP | 411181500 A | * | 7/1999 |
| WO | 9709031 A | * | 6/1999 |

* cited by examiner

Primary Examiner—Arthur L. Corbin
(74) Attorney, Agent, or Firm—Barnes & Thornburg

(57) ABSTRACT

Disclosed is an inhibitory agent for kneaded meat and process for producing fish and meat paste products, especially, kamabokos, and fish sausages. The inhibitory agent comprises (i) a member selected from sorbitol, trehalose, mixture thereof, and another saccharide(s) containing sorbitol and/or trehalose; and (ii) a pH-controlling agent which adjusts a kneaded meat to an alkaline pH. The agent effectively inhibits the protein denaturation of kneaded meat, and fish- and meat-paste products without using a phosphate.

30 Claims, 1 Drawing Sheet

Figure 1:
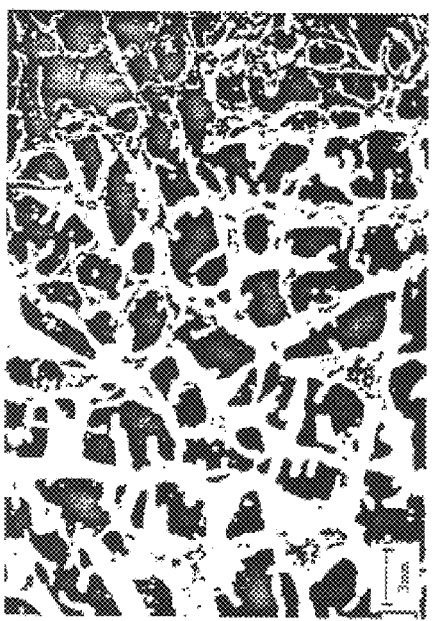
Figure 1:
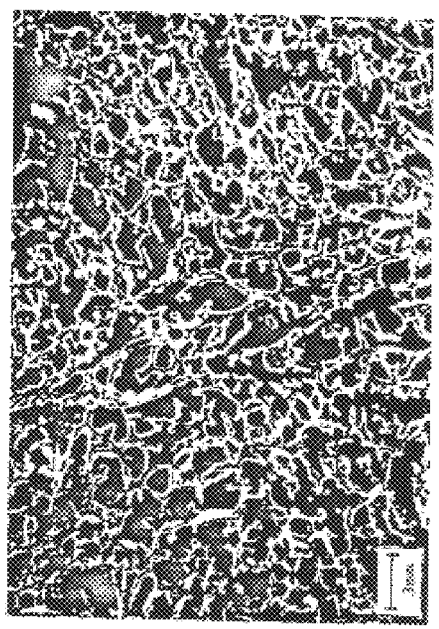
Figure 1:
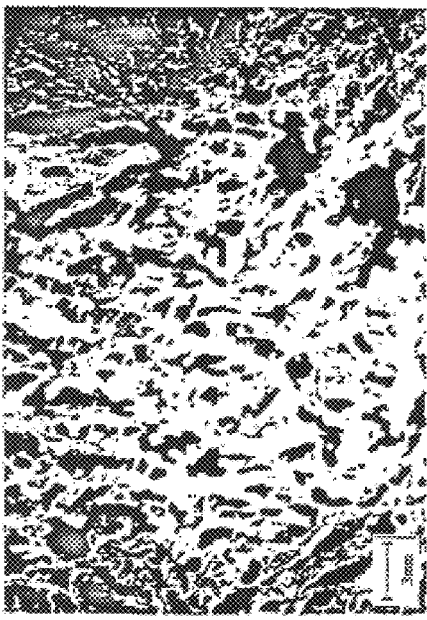
Figure 1:
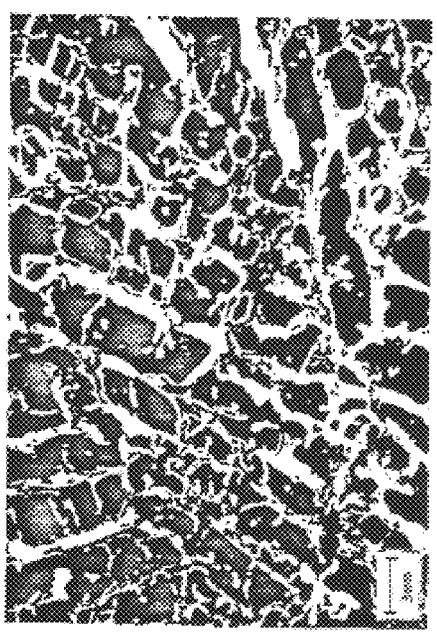

Surimi of Alaska pollack
with 5% by weight of sucrose
Test group 1

Surimi of Alaska pollack
with 5% by weight of sorbitol
Test group 2

Surimi of Alaska pollack
with 5% by weight of trehalose
Test group 3

Surimi of Alaska pollack
with 8% by weight of sucrose
Test group 4

INHIBITORY AGENT FOR PROTEIN DENATURATION, KNEADED MEAT WITH SUPPRESSED FREEZING-DENATURATION, PROCESS THEREOF, AND PROCESS OF FISH AND MEAT PASTE PRODUCTS

BACKGROUND OF THE INVENTION

1. Field of the Invention

The present invention relates to an inhibitory agent suitable for kneaded meat, especially frozen fish surimi; a drip-inhibitory agent; an inhibitory agent for spongy-meat-formation induced by freezing; an agent for enhancing the stability formation of fish surimi; kneaded meat and process thereof; food products, including kneaded meat of poultry and animals, free of phosphate and with suppressed freezing-denaturation; a method for freezer storage for kneaded meat; a process for producing fish and meat paste products, especially, kamabokos, fish sausages, and kneaded meat of poultry and animals; a method for enhancing the formation of stability of kneaded meat; and a method for increasing the yield of kneaded meat.

2. Description of the Prior Art

In the field of recent food industry, it may tend to reduce or even avoid the use of food additives. Consumers' minds or feelings and social environment make food processors to explore food products, which are suitable for such commercial needs, and to reduce food additives as much as possible. Particularly, phosphates such as sodium pyrophosphate and sodium polyphosphate are used in fish and meat paste products to improve their freezing tolerance and moisture-retaining ability. However, excessive amount of intake of them may result in an unsatisfactory inhibition of absorbing calcium and minerals by the body, and may susceptibly induce diseases such as osteoporosis, growth inhibition, and taste-blindness. Because of this, the above tendency to avoid or even stop the use of phosphates is on going, particularly, movement or campaign to eliminate phosphates from fish paste products has been strikingly highlighted.

There exists a quite hard problem to be overcome in producing fish meat products without using phosphates while keeping the satisfactory processibility. Conventional frozen-surimi (frozen minced fish meat) free of phosphate, can be processed with only sugar, i.e., sucrose, in an amount of 5% by weight to frozen surimi available at stores and of 8% by weight to those which are processed and stored on ships. In these products, sugar only exerts a relatively-lesser inhibitory activity for freezing-induced protein-denaturation, and fails to keep their high-quality for a relatively-long period of time. Therefore, raw surimi should be used in some fields even though it is partial. In other words, raw surimi should be used without intention even if it is more quickly deteriorated than frozen surimi, meaning that it could not be diluted or brought up volume with water, it has no economical benefit and has only 3- to 4-days of shelf-life even under cold-storage conditions.

In conventional frozen-surimi in general, the protein denaturation thereof has been tried to be inhibited using 5% by weight of sucrose and 0.2% by weight of phosphate(s). Fish meat proteins are susceptible to denaturation when frozen and to lose their solubility against salts. The mechanism of the denaturation has not yet been solved, but the main causative is deemed to be the influence of calcium and magnesium on proteins, resulting in a use of phosphates which inhibit the denaturation of proteins.

It is understood that sugar fines down ice crystals, which are formed by freezing water in myofibrils of fish meat, and prevents the dehydration of proteins. Fish meat myosins in rod-shape molecules associate each other by forming intermolecular cross-links during cold storage, and coagulate by forming floc when the rod-shape molecules proceed to associate. Freezing denaturation is deemed to be triggered by the change of state of water. Proteins and other components in living tissues generally exist in a state where they are sufficiently saturated with water in such a manner that the molecular surfaces are covered with water. As a result, the higher-order structure of proteins is stabilized. It is understood that intramolecular bonds of hydrogen- and hydrophobic-bonds in proteins inevitably correlate to hydration state. Freezing of food products causes the icing and transfer of water, resulting in a removal of water around protein molecules and of hydration water partially or substantially wholly, and leading to an estimation of that the molecules are highly-dehydrated by some degree to loosen and cut the intermolecular cross-links and to confuse the higher-order structure of proteins. Thus, the effect of sugar is considered as follows: It physically causes ice-point reduction, fines down ice crystals, and prevents protein damage.

Stabilization of the quality of surimi free of phosphate, i.e., the prevention or inhibition of protein denaturation during cooling and freezing is quite impossible with only sugar because proteins are susceptible to denaturation during freezer storage, and then gelatinized and sponged to lose moisture-retaining ability by a large margin.

Under these circumstances, Japanese Patent Kokoku No. 23,385/72 discloses a conventional inhibitory agent for protein denaturation and a process for producing frozen-surimi; a technique for inhibiting the freezing,denaturation of surimi by adjusting the pH of surimi before freezing to pHs of 7.5 to 9, and freezing the resulting surimi. Japanese Patent Kokai Nos. 135,927/95 and 9,931/96 disclose another techniques for inhibiting the freezing denaturation of fish surimi by adding trehalose.

Suisan-Kako-Shin-Genryo-Kalhatsu-Jigyo-Hokokusho (*Annual Report of* 1997 by the Project of Development for New Fishery Processing Materials) in 1997, published on July in 1998 by the Fishery Processing Division of Fishery Administration Department of Fishery Agency of Japan discloses a technique comprising mincing "tokage-eso", i.e., Saurida elongate, and Atlantic cutlassfish, leaching the mixture in an alkaline electrolytic water with a pH of 10 to 11, dehydrating the mixture, adding sucrose and trehalose to the dehydrated mixture, and freezing the resulting mixture into a frozen surimi with improved gel-forming ability.

In conventional techniques using either trehalose or alkaline electrolytic water for leaching fish meat, there found insufficient inhibitory effect on freezing denaturation; the product yield reduction by dripping, spongy meat formation by freezing, and formation reduction of setting of fish surimi. Thus, development of higher technology will be highly appreciated.

In the prior art disclosed in the above Suisan-Kako-Shin-Genryo-Kaihatsu-Jigyo-Hokokusho (*Annual Report of* 1997 by the Project of Development for New Fishery Processing Materials), alkaline leaching reduces the product yield, and electrolytic water used for the leaching results in a problem of wastewater treatment. In general, kamaboko prepared with surimi containing a residual alkali may be incorporated into products, resulting in fragile mouth feel; Alkali-removing step should be required after alkaline leaching to avoid leached surimi from becoming to show alkaline pHs carefully.

SUMMARY OF THE INVENTION

The present invention was made based on the above conventional drawbacks, and the objects according to the present invention are to provide: An inhibitory agent for protein denaturation with a relatively-high suppressed freezing-denaturation inhibitory effect, a drip-inhibitory agent, an inhibitory agent for forming sponge-texture when freezed, an enhancer for forming setting of kneaded fish surimi, kneaded meat with suppressed freezing denaturation and process thereof, a food product including kneaded meat of poultry and animals free of phosphate and with suppressed freezing-denaturation, a method for freezer storage for kneaded meat, a process for producing kneaded meat, particularly, fish and meat paste products; kamabokos, sausages of fish meat, and kneaded meat of poultry and animals, a method for enhancing the formation of setting of the products, and a method for increasing the yield of these products.

To attain the above objects, the present inhibitory agents for protein denaturation, dripping, and formation of sponge texture by freezing, as well as the present agent for enhancing the formation of setting of fish surimi are characterized in that they comprise sorbitol and/or trehalose, or another saccharides along with sorbitol and/or trehalose; and a pH-controlling agent capable of adjusting the pH of kneaded meat to alkaline pHs. The pH-controlling agent used in the present invention includes those which can increase the pH of kneaded meat to an alkaline pH higher than the initial pH, even if the pH of the kneaded meat after pH adjustment is an acid pH. Preferably, alkaline pHs exceeding 7 but below 10, and more preferably those exceeding 7.5 but below 9.5. In particular, in the present inhibitory agents for protein denaturation, dripping, and formation of sponge texture by freezing, and the agent for enhancing the formation of setting of fish surimi, sodium carbonate and/or potassium carbonate can be preferably used as the present pH-controlling agent where the carbonates can be preferably used in an amount of from 0.05% by weight to 10-times by weight of the total amount of sorbitol, trehalose, and another saccharides, and most preferably in an amount in the range of 1–5% by weight.

The inhibitory agents for protein denaturation, dripping, and formation of sponge texture by freezing, and the agent for enhancing the formation of setting of fish surimi according to the present invention preferably further contain an emulsifier such as sucrose fatty acid esters. The emulsifier should preferably be incorporated into the present agents in an amount of from 10% by weight to 10-times by weight of the amount of the pH-controlling agent, and most preferably in an amount of from the equal amount to 2-times amount of the pH-controlling agent. The emulsifier exerts an inhibitory effect on freezing denaturation by inhibiting the formation of ice crystals. The agents according to the present invention should preferably contain sweeteners with glycoside sweeteners. The sweeteners used in the present invention are, for example, sodium glycyrrhizinate, licorice extract, and stevioside sweetener, which are mainly used to mask salty taste of the pH-controlling agent and to sweeten and stabilize the emulsifier. The drip inhibitory agent can be used as one for improving the product yield.

The present kneaded meat with suppressed freezing-denaturation comprises the present inhibitory agent for protein denaturation, and further has a characteristic feature of an alkaline pH exceeding 7 but below 10. The present kneaded meat should preferably contain 1–20% by weight of trehalose and 0.01–10% by weight of sodium carbonate and/or potassium carbonate, and has a pH exceeding 7.5 but below 9.5. The present food products free of phosphate and with suppressed freezing-denaturation comprise, as a characteristic feature, the present inhibitory agent for protein denaturation and have an alkaline pH exceeding 7 but below 10, and preferably a pH exceeding 7.5 but below 9.5.

The present process for producing kneaded meat with suppressed freezing-denaturation is characteristic of incorporating into a kneaded meat (i) sorbitol, trehalose, or another saccharide(s) along with sorbitol and/or trehalose; and (ii) a pH-controlling agent to adjust the pH of kneaded meat to an alkaline pH exceeding 7 but below 10; In particular, it is preferable to incorporate into a kneaded meat 1–20% by weight of trehalose and 0.01–10% by weight of sodium carbonate and/or potassium carbonate, and to adjust the pH of the kneaded meat to a pH exceeding 7.5 but below 9.5. For example, such a kneaded meat is made of fish surimi. Fish surimi and another kneaded food products can be admixed with other additives includes amylaceous substances such as corn starch, sweet potato starch, potato starch, wheat starch, and barley starch; seasonings such as sodium glutamate and salt; preservatives such as sorbic acid; emulsifiers such as sucrose fatty acid ester; glycoside sweeteners such as sodium glycyrrhizinate, licorice extract, and stevioside sweetener; and optionally one or more additives of colors and flavors. The emulsifiers can be preferably incorporated into kneaded meat in an amount of 0.01 to 1% by weight, and preferably 0.1 to 0.2% by weight of the kneaded meat.

The present method for freezer storage of kneaded is featured in that it comprises: (a) incorporating into a kneaded meat sorbitol, trehalose, or another saccharide(s) containing sorbitol and/or trehalose; (b) incorporating into the mixture a pH-controlling agent to adjust the pH of the mixture to an alkaline pH exceeding 7 but below 10, and preferably a pH exceeding 7.5 but below 9.5; and subjecting the resulting mixture to freezer storage.

The present process for producing fish and meat paste products, particularly, kamaboko and fish sausage is characterized in that it is processed with the following fish surimi as a material obtained by: incorporating into a fish surimi 1–20% by weight of trehalose and 0.01–10% by weight of sodium carbonate and/or potassium carbonate to adjust the pH of the resulting surimi to an alkaline pH exceeding 7 but below 10, and preferably a pH exceeding 7.5 but below 9.5.

The present process for producing kneaded meat processed with poultry and animals can be prepared using kneaded meat of poultry and animals obtained by incorporating thereunto 1–20% by weight of trehalose and 0.01–10% by weight of sodium carbonate and/or potassium carbonate, and adjusting the resulting mixture to pHs exceeding 6 but below 10, preferably pHs exceeding 7 but below 10, and more preferably pHs exceeding 7.5 but below 9.5.

The present methods for enhancing the formation of setting and for increasing the product yield are characteristic of using 1–20% by weight of sorbitol, trehalose, another saccharides, or mixtures thereof with respect to the weight of surimi, and an adequate amount of a pH-controlling agent; and adjusting the resulting mixtures to alkaline pHs exceeding 7 but below 10, and preferably pHs exceeding 7.5 but below 9.5.

BRIEF EXPLANATION OF THE ACCOMPANYING DRAWING

FIG. 1 shows visualized images of the texture of frozen surimis of Alaska pollack obtained in Example 12 according to the present invention.

DETAILED DESCRIPTION OF THE INVENTION

As it is well known in the art, trehalose has three optical isomers called α,α-, α,β and β,β-isomers. These optical isomers exert substantially the same inhibitory activity on protein denaturation and can be arbitrarily used in the present invention. Thus, any trehalose can be used in the present invention independently of their process, form, and purity as long as they contain one or more of the isomers in an effective amount in total. Such a trehalose can be produced in different methods.

Detailed description on the methods for producing trehalose is dare to be omitted because the present invention in itself is not for the preparation of trehalose per se. In view of economical benefit, either of processes as disclosed in Japanese Patent Kokai Nos. 143,876/95, 213,283/95, 322,883/95, 298,880/95, 66,187/96, 66,188/96, 336,388/96, and 84,586/96, where non-reducing saccharide-forming enzymes and trehalose-releasing enzymes are allowed to act on partial starch hydrolysates to produce trehalose. With these processes, α,α-trehalose can be yielded from rather low-cost starches in a satisfactorily-high yield. As for commercially available products prepared by the above processes, "TREHAOSE®", a food grade trehalose powder with a trehalose purity of at least 98%, commercialized by Hayashibara Shoji, Inc., Okayama, Japan; and "TREHASTER®", a food grade trehalose syrup with a trehalose purity of at least 28%, commercialized by Hayashibara Shoji, Inc., Okayama, Japan, can be mentioned.

α,α-Trehalose is obtainable by allowing either of maltose/trehalose converting enzymes as disclosed in Japanese Patent Kokai Nos. 170,977/95, 263/96, and 149,980/96 to act on their substrates, or allowing both maltose and trehalose phosphorylases to act on their substrates. β,β-Trehalose can be produced by allowing successively cyclomaltodextrin glucanotransferase and β-galactosidase to a mixture of partial starch hydrolysate and lactose according to the method as disclosed in Japanese Patent Kokai Nos. 144,694/92 and 179,490/92. β,β-Trehalose can be also prepared by conventional chemical syntheses.

Trehalose used in the present invention should not necessarily be in an isolated form, and may be those in the form of a composition unseparated from concomitant saccharides inherent to their processes, or in the form of a mixture of trehalose and another saccharides as long as they attain the present objects. The pH-controlling agent usable in the present invention includes organic- and inorganic-salts, and preferably inorganic salts of carbonates, particularly, sodium carbonate and/or potassium carbonate.

Examples of the another saccharides used in the present invention are reducing sugars such as glucose, maltose, lactose and fructose; non-reducing saccharides such as sucrose and raffinose; and sugar alcohols such as mannitol, lactitol and maltitol. In the present invention, trehalose is most preferably used as a saccharide, and sorbitol can be also preferably used with or without trehalose. Considering production cost, trehalose and sorbitol and/or sucrose can be preferably used in combination.

The kneaded meat used in the present invention includes fish-, poultry- and animal-meats, which are to be preserved in raw- or under freezing-conditions. The present production method for producing kneaded meat with suppressed freezing-denaturation is more advantageous for producing freezed surimi of fish meat. The present inhibitory agent for protein denaturation is applicable for kneaded meat, cheeses, egg products, and protein-containing foods, and is most preferably used as a replacement of phosphates in non-phosphate food products.

The fish surimi usable in the fish paste products according to the present invention include all kinds of fishes, which can be used as materials for the fish paste products, for example, Alaska pollack and another fishes including redlip croaker, white and black croaker, pike eel, lizard fish, black tonguefish, big-eyed flathead, gurnard, Atlantic cutlassfish, horse mackerel, blue drum, Japanese bluefish, cod, black rockfish, barracuda, blue shark, hammerhead shark, thresher shark, bonito shark, starspotted smooth-hound, Indo-Pacific blue marlin, ray, skate, Japanese argentine, flatfish, sardine, long shanny, and arabesque greenling.

In the present invention, in the case of using sodium carbonate and/or potassium carbonate as a pH-controlling agent, and using surimi of Alaska pollack as a kneaded meat, the amount of trehalose to be added is preferably 1–20% by weight, and more preferably 5% by weight to surimi; and the amount of sodium carbonate and/or potassium carbonate to be added is preferably 0.1–0.2% by weight to surimi Sodium carbonate is most preferably used in an amount of 0.1% by weight to surimi. Under these conditions, the meat of Alaska pollack has an alkaline pH exceeding 7 but below 10, usually a pH exceeding 7.5 but below 9.5, and has an extremely-high moisture-retaining ability and gel-forming ability even in a freezing state, and this enables the production of raw- or freezed-surimi with stabilized quality. According to the present invention, deterioration inhibitory action of fish meat lipids exerted by trehalose can be also expected.

Although it is not sure the reason why it is preferable to control the pH of kneaded meat to alkaline pHs exceeding 7 but below 10, the followings can be speculated: Kneaded meat, especially, fish meat proteins strikingly decrease their solubility in salts at a pH around 6.0, and lower their viscosity under alkaline or acid pHs. Under acid pHs of not higher than pH 6.0 or alkaline pHs of 10 or more, the viscosity of proteins lowers, resulting in a reduction of the stability of proteins in muscles. Edible meat fibers, particularly, fish meat fibers highly swell at pHs of around 7, usually pHs of 7.5 or higher. The present inventors confirmed that conventionally used phosphates exert such a swelling effect, and found unexpectedly that carbonates, particularly, sodium carbonate and potassium carbonate have an outstanding swelling effect.

The present invention was made with respect to the swelling phenomenon of kneaded meat under wide pH ranges, and to the inhibitory effect on protein denaturation induced by the phenomenon. It can be understood that the mechanism of the present inhibitory effect on protein denaturation may be exerted by the denaturation and deterioration of proteins in such a manner that actomyosin in muscular fibers is increased its moisture-retaining ability at higher pH-regions, and strongly catch free water via the hydration power of saccharides. The present inhibitory agent for protein denaturation has a strong inhibitory effect on the freezing denaturation of kneaded meat, and also has a strong drip-inhibitory effect and inhibitory effect on sponge-formation induced by freezing. The present inhibitory effect on protein denaturation more effectively inhibits the freezing denaturation during freezer storage for a relatively-long period of time. The present agent for enhancing the formation of setting of fish surimi improves the formation stability of setting of the surimi, keeps the elasticity of fish and meat pasted products, and improves their quality.

The following examples explain the present invention in more detail:

EXAMPLE FOR EXPERIMENT 1

The following experiments were carried out to study the relationship between the concentration of salts and the pH and swelling degree of fish surimi; To a leached raw Alaska pollack were added 5% by weight of a saccharide and a prescribed concentration of a salt to obtain a surimi. One hundred and grams of the surimi were admixed with 900 g of desalted water, followed by homogenization into a test sample as a surimi. After the preparation, the sample was instantly measured for pH, allowed to stand in a refrigerator for 12 hours, and macroscopically observed on the swelling degree of surimi. The results are in Table 1. In the table, the symbols "−", "+", "++", and "+++" mean unswelled, slightly swelled, swelled, and satisfactorily swelled, respectively.

TABLE 1

Relationship between the concentration of organic acid salts and the pH and swelling degree of fish surimi

| | Salt | Concentration (%) | pH | Swelling degree |
|---|---|---|---|---|
| Sucrose 5% | Phosphate | 0.20 | 7.35 | +++ |
| | Sodium carbonate | 0.05 | 7.52 | +++ |
| | | 0.10 | 7.93 | +++ |
| | | 0.15 | 8.43 | +++ |
| | | 0.20 | 8.97 | + |
| | Sodium citrate | 0.20 | 7.28 | + |
| | Sodium dl-malate | 0.20 | 7.16 | + |
| | Sodium gluconate | 0.20 | 7.16 | + |

As evident from Table 1, the surimis with organic acid salts did not increased to pH 7.5 even at a concentration of 0.20% by weight. Among the phosphate, only phosphate showed the highest swelling degree of surimi, and one with sodium phosphate gave a pH exceeding 7.5 and a relatively-high swelling degree even at a concentration of 0.05% by weight.

EXAMPLE FOR EXPERIMENT 2

Using trehalose as a saccharide, an experiment similarly as in Example for Experiment 1 was carried out to study the pH and swelling degree of fish surimi using the saccharides and salts as shown in the upper column of Table 2. The results are in Table 2. In Table 2, swelling degree is expressed based on the same criteria as used in Table 1 were employed. Throughout the Examples for Experiments and the later described Examples, "TREHAOSE®", a food grade trehalose powder with a trehalose purity of at least 98%, commercialized by Hayashibara Shoji, Inc., Okayama, Japan, was used as the trehalose.

TABLE 2

Effect of the combination use of trehalose and sodium carbonate

| | Sucrose 5% | Sucrose 5% + Phosphate 0.2% | Trehalose 5% | Trehalose 5% + Sodium carbonate 0.1% | Trehalose 5% + Sodium carbonate 0.2% |
|---|---|---|---|---|---|
| pH | 7.17 | 7.35 | 7.18 | 7.93 | 8.97 |
| Swelling degree | − | +++ | +++ | +++ | +++ |

As evident from Table 2, fish surimi with only trehalose did not increase to a pH of 7.5 and showed a relatively-low swelling degree, while one with trehalose and sodium carbonate showed a pH exceeding 7.5 and a higher swelling degree.

EXAMPLE FOR EXPERIMENT 3

The following experiment was carried out to study the relationship between the molar concentration of salts and the pH of fish surimi; A mixture of a surimi of leached raw Alaska pollack and deionized water in a weight ratio of 1:8 was prepared and homogenized. Ninety grams aliquots of the homogenate were weighed and prepared into solutions with prescribed concentrations using 0.1 M/l of the salts, as shown in Table 3, and 100-ml volumetric flasks. The pH of the solutions was measured on a pH meter. The results are in Table 3.

TABLE 3

Relationship between the molar concentration and pH of organic- and inorganic-salts

| | 0.005M | 0.01M | 0.02M | 0.03M |
|---|---|---|---|---|
| Sodium pyrophosphoric acid | | | | |
| % | 0.133 | 0.266 | 0.532 | 0.798 |
| pH | 7.27 | 7.49 | 8.08 | 8.64 |
| Sodium polyphosphoric acid | | | | |
| % | 0.184 | 0.367 | 0.734 | 1.101 |
| pH | 7.17 | 7.40 | 7.98 | 8.42 |
| Sodium carbonate | | | | |
| % | 0.053 | 0.106 | 0.212 | 0.318 |
| pH | 7.39 | 7.77 | 8.90 | 9.51 |
| Potassium carbonate | | | | |
| % | 0.069 | 0.138 | 0.279 | 0.414 |
| pH | 7.34 | 7.78 | 8.85 | 9.39 |
| Sodium citrate | | | | |
| % | 0.129 | 0.258 | 0.516 | 0.774 |
| pH | 7.05 | 7.09 | 7.15 | 7.27 |
| Sodium gluconate | | | | |
| % | 0.109 | 0.218 | 0.436 | 0.654 |
| pH | 6.97 | 6.87 | 6.96 | 6.99 |
| Sodium L-malate | | | | |
| % | 0.094 | 0.187 | 0.374 | 0.561 |
| pH | 6.97 | 6.87 | 6.96 | 6.99 |
| Sodium hydroxide | | | | |
| % | 0.02 | 0.04 | 0.08 | 0.12 |
| pH | 7.24 | 7.56 | 8.53 | 9.45 |

As evident from Table 3, only sodium carbonate, potassium carbonate and sodium hydroxide increased the pH of fish surimi to pHs exceeding 7.5 but below 9.5 when used 0.01–0.03M, while the resting organic acids could not bring the surimi to such pH levels. Condensed phosphates such as sodium pyrophosphate and sodium polyphosphate failed to bring the surimi to a pH 9.0 even when added in a 3-time volumes of sodium carbonate or potassium carbonate. Use of condensed phosphates in a relatively-high concentration is problematic in view of dietetics, and it should not be used in an amount of 0.2% by weight or higher because it deteriorates the texture of fish and animal meats.

EXAMPLE FOR EXPERIMENT 4

The following experiment was conducted to study the freezing-denaturation inhibitory effect, i.e., freezing-denaturation protection effect, of trehalose on fish meat proteins; Using fresh Alaska pollack meat, to which had been added 5% by weight of trehalose or 5% by weight of sorbitol to the meat, kamabokos were processed before and after freezing at prescribed time intervals and evaluated by a bending test. The results are in Table 4. The bending test was done by cutting a casing kamaboko by 0.5 mm in thickness and evaluating the slices based on the following criteria; Grades "AA", "A", "B" and "C" mean that it formed no crack when folded in four, it formed cracks when folded in four, it did not form crack when folded in two, and it formed cracks when folded in two, respectively.

TABLE 4

Comparison of sorbitol and trehalose

| | Before freezing | Just after freezing | 1-Month | Period of freezer storage 2-Months | 3-Months | 6-Months |
|---|---|---|---|---|---|---|
| Sorbitol 5% | AA | AA | A | B | B | B |
| Trehalose 5% | AA | AA | A | A | A | B |

As evident from Table 4, it was revealed that trehalose exhibited substantially the same effect on casing kamaboko as sorbitol except that it showed a superior effect than sorbitol after 3-months standing on freezing.

EXAMPLE FOR EXPERIMENT 5

To study freezing-denaturation inhibitory effect on fish meat proteins by the combination use of trehalose and salts, the following experiment was carried out; A leached fresh raw surimi of Alaska pollack was admixed with a prescribed amount of the saccharides and salts as shown in Table 5 into surimis, followed by freezing the surimis at −20° C. into freezed surimis. Kamabokos were processed with the freezed surimis and evaluated their quality by subjecting to the same bending test as in Experiment 4. The results are in Table 5.

TABLE 5

Combination effect of sorbitol, trehalose and salts

| | Before freezing | Just after freezing | 1-Month | 3-Months | 6-Months |
|---|---|---|---|---|---|
| Sorbitol 5% + Sodium phosphate 0.2% | AA | AA | AA | AA | AA |
| Trehalose 5% + Sodium phosphate 0.2% | AA | AA | AA | AA | AA |
| Sorbitol 5% + Sodium L-malate 0.2% | AA | A | A | B | C |
| Trehalose 5% + Sodium L-malate 0.2% | AA | A | A | B | C |
| Sorbitol 5% + Sodium citrate 0.2% | AA | AA | A | B | C |
| Trehalose 5% + Sodium citrate 0.2% | AA | AA | A | B | B |
| Sorbitol 5% + Sodium carbonate 0.2% | AA | AA | AA | A | A |
| Trehalose 5% + Sodium carbonate 0.2% | AA | AA | AA | AA | A |
| Sorbitol 5% + Potassium carbonate 0.2% | AA | AA | A | A | B |
| Trehalose 5% + Potassium carbonate 0.2% | AA | AA | A | A | B |

As evident from Table 5, the combination use of sodium phosphate and sorbitol or trehalose exhibited the highest denaturation inhibitory effect, while either the combination use of trehalose and sodium carbonate or the one of sorbitol and sodium carbonate also exerted such an effect.

EXAMPLE FOR EXPERIMENT 6

To determine the optimum concentration of protein denaturation inhibitory effect by the combination use of trehalose and sodium carbonate, surimis were processed by adding 5% by weight of trehalose and a different concentration of 0.1–0.3% by weight of sodium carbonate, as shown in the left column of Table 6, to a raw meat of Alaska pollack. As a comparison, another surimi was processed by adding 5% by weight of sorbitol and 0.2% by weight of phosphate to a raw meat of Alaska pollack. Using these surimis, casing kamabokos were prepared on 7-, 30-, and 60-days of freezer storage, and were subjected to sensory evaluation. The casing kamabokos were processed with 3% by weight of salt, free of starch, and 20% by weight of water. The examination on elasticity was evaluated based on the following criteria: Grade 5.0 which means that it was extremely elastic; grade 4.0 meaning that it was a satisfactory elastic; grade 3.0 meaning that it was low in elasticity; grade 2.0 meaning that it was slightly elastic; and grade 1.0 meaning that it was unsubstantially elastic. While the examination on stiffness was evaluated based on the following criteria: Grade 5.0 which means that it was extremely stiff; grade 4.0, meaning that it was relatively stiff; grade 3.0 meaning that it was normal in stiffness; grade 2.0 meaning that it was slightly fragile; and grade 1.0 meaning that it was extremely fragile. The results are in Table 6.

TABLE 6

Combination effect of trehalose and sodium carbonate

| | pH of raw surimi | Evaluation results of kamaboko (Upper column: Elasticity Lower column: Stiffness) | | | |
|---|---|---|---|---|---|
| | | Before freezing | \multicolumn{3}{c}{Days of freezer storing} |
| | | | 7 | 30 | 60 |
| Sorbitol 5% | | | | | |
| Phosphate 0.2% | 7.21 | 5.0 4.5 | 5.0 4.5 | 5.0 4.5 | 4.5 4.0 |
| Trehalose 5% | | | | | |
| Phosphate 0.2% | 7.24 | 5.0 4.5 | 4.5 4.0 | 4.0 3.5 | 3.5 3.0 |
| Sodium carbonate 0.1% | 7.93 | 5.0 5.0 | 5.0 4.5 | 5.0 4.0 | 4.5 3.0 |
| Sodium carbonate 0.2% | 8.96 | 5.0 5.0 | 5.0 4.5 | 4.5 4.0 | 4.0 3.5 |
| Sodium carbonate 0.3% | 9.93 | 5.0 4.5 | 4.5 4.0 | 4.5 4.0 | 4.0 3.0 |

As evident from Table 6, the combination use of 5% by weight of trehalose and 0.1% by weight of sodium carbonate attained substantially the same denaturation inhibitory effect as that attained by the combination use of sorbitol and phosphate.

EXAMPLE 1

A fresh raw meat of Alaska pollack was admixed with 5% by weight of sucrose into a surimi. Casing kamabokos as a test group 1 were prepared with the surimi, 3% by weight of salt, free of starch, and 0, 15 or 30% by weight of water. As a test group 2, another surimi was prepared by adding to a fresh raw meat of Alaska pollack 5% by weight of trehalose and 0.1% by weight of sodium carbonate. Casing kamabokos were prepared with the another surimi, 3% by weight of salt, free of starch, and 0, 15 or 30% by weight of water. These kamabokos were respectively processed before and just after the freezing, and on 30- and 60-days of freezer storage of surimis. The processed kamabokos were measured for pH and elasticity by a food rheometer with a plunger of 5 mm in diameter, subjected to sensory evaluation for elasticity and stiffness using 5-point evaluation test similarly as in Example for Experiment 6, and further evaluated by the bending test similarly as in Example for Experiment 4. The results are in Tables 7 to 10.

TABLE 7

Combination effect of trehalose and sodium carbonate (before freezing)

| | Water added (0%) | | Water added (15%) | | Water added (30%) | |
|---|---|---|---|---|---|---|
| | Test group 1 | Test group 2 | Test group 1 | Test group 2 | Test group 1 | Test group 2 |
| pH | | | | | | |
| Surimi | 7.14 | 7.91 | — | — | — | — |
| Kamaboko | 6.86 | 7.40 | 6.89 | 7.43 | 6.87 | 7.44 |
| Moisture content (%) | 75.9 | 75.9 | — | — | — | — |
| Whitening degree (L-value) | 62.8 | 62.8 | — | — | — | — |
| Elasticity (g/cm$^2$) | 294 | 338 | 173 | 259 | 114 | 226 |
| Sensory evaluation | | | | | | |
| X | 5.0 | 5.0 | 4.5 | 5.0 | 4.0 | 5.0 |
| Y | 5.0 | 4.5 | 3.5 | 4.0 | 3.0 | 4.0 |
| Bending test | AA | AA | AA | AA | AA | AA |

Note:
The symbol "X" means "elasticity", and the symbol "Y" means "stiffness".

TABLE 8

Combination effect of trehalose and sodium carbonate (just after freezing)

| | Water added (0%) | | Water added (15%) | | Water added (30%) | |
|---|---|---|---|---|---|---|
| | Test group 1 | Test group 2 | Test group 1 | Test group 2 | Test group 1 | Test group 2 |
| pH | | | | | | |
| Surimi | 7.19 | 7.87 | — | — | — | — |
| Kamaboko | 6.84 | 7.43 | 6.89 | 7.44 | 6.89 | 7.48 |
| Moisture content (%) | 74.3 | 76.2 | — | — | — | — |

TABLE 8-continued

Combination effect of trehalose and sodium carbonate (just after freezing)

|  | Water added (0%) | | Water added (15%) | | Water added (30%) | |
| --- | --- | --- | --- | --- | --- | --- |
|  | Test group 1 | Test group 2 | Test group 1 | Test group 2 | Test group 1 | Test group 2 |
| Whitening degree (L-value) | 61.7 | 60.3 | — | — | — | — |
| Elasticity (g/cm$^2$) | 248 | 291 | 149 | 150 | 100 | 102 |
| Sensory evaluation |  |  |  |  |  |  |
| X | 4.0 | 5.0 | 3.0 | 4.0 | 3.0 | 3.0 |
| Y | 4.5 | 4.5 | 3.5 | 3.5 | 2.5 | 2.0 |
| Bending test | AA | AA | AA | AA | AA | AA |

Note:
The symbol "X" means "elasticity", and the symbol "Y" means "stiffness".

TABLE 9

Combination effect of trehalose and sodium carbonate (on 30-days of freezer storage)

|  | Water added (0%) | | Water added (15%) | | Water added (30%) | |
| --- | --- | --- | --- | --- | --- | --- |
|  | Test group 1 | Test group 2 | Test group 1 | Test group 2 | Test group 1 | Test group 2 |
| pH |  |  |  |  |  |  |
| Surimi | 7.04 | 8.25 | — | — | — | — |
| Kamaboko | 6.69 | 7.67 | — | — | — | — |
| Moisture content (%) | 74.2 | 77.5 | — | — | — | — |
| Elasticity (g/cm$^2$) | 210 | 427 | 137 | 277 | 77 | 196 |
| Sensory evaluation |  |  |  |  |  |  |
| X | 2.5 | 5.0 | 2.5 | 5.0 | 1.0 | 4.0 |
| Y | 3.5 | 4.5 | 2.5 | 4.5 | 2.0 | 3.0 |
| Bending test | B | AA | A | AA | C | AA |

Note:
The symbol "X" means "elasticity", and the symbol "Y" means "stiffness".

TABLE 10

Combination effect of trehalose and sodium carbonate (on 60-days of freezer storage)

|  | Water added (0%) | | Water added (15%) | | Water added (30%) | |
| --- | --- | --- | --- | --- | --- | --- |
|  | Test group 1 | Test group 2 | Test group 1 | Test group 2 | Test group 1 | Test group 2 |
| pH |  |  |  |  |  |  |
| Before salting | 7.03 | 7.77 | — | — | — | — |
| After salting | 6.75 | 7.46 | — | — | — | — |
| Moisture content (%) | 78.8 | 80.6 | — | — | — | — |
| Elasticity (g/cm$^2$) | 242 | 351 | 151 | 229 | 105 | 169 |
| Sensory evaluation |  |  |  |  |  |  |
| X | 3.0 | 4.0 | 2.7 | 3.5 | 2.5 | 4.0 |
| Y | 3.1 | 4.0 | 2.6 | 3.6 | 2.5 | 4.0 |
| Bending test | A | AA | B | AA | B | AA |

Note:
The symbol "X" means "elasticity", and the symbol "Y" means "stiffness".

As evident from the results in Tables 7 to 10, the test group 2 was more highly evaluated than the test group 1 with respect to elasticity, stiffness, and bending test. In particular, the difference was more clear cut on 30- and 60-days of freezer storage.

EXAMPLE 2

A fresh raw meat of Alaska pollack was admixed with 5% by weight of sugar to obtain a surimi, followed by adding to the surimi water in the amount (% by weight) as indicated in the left column of Table 11, and then 3% by weight of salt without addition of starch to obtain a casing kamaboko (test group 1). Another fresh raw meat of Alaska pollack was admixed with 5% by weight of trehalose and 0.1% by weight of sodium carbonate into a surimi, followed by adding to the surimi water in the amount (% by weight) as indicated in the left column of Table 11, and then 3% by weight of salt without addition of starch to obtain a casing kamaboko (test group 2). These kamabokos were respectively processed before, just after, and 30- and 60-days after the freezing storage of surimis. The processed kamabokos were measured for elasticity by a food rheometer with a plunger of 5 mm in diameter. Based on the measured elasticity, the effect of water extensibility was calculated by the following equation:

$$\text{Effect of water extensibility} = \frac{E2 \times 100}{E1}$$

Note: The symbol "E1" means "elasticity value measured in the test group 1 $(g/cm^2)$", and the symbol "E2" means "elesticity value measured in the test group 2 $(g/cm^2)$".

TABLE 11

Combination effect of trehalose and sodium carbonate (effect of water extensibility)

| | | Before freezing | Just after freezing | 30-Days after freezing | 60-Days after freezing |
|---|---|---|---|---|---|
| Water added (by weight) | 0% | 115% | 117% | 203% | 145% |
| | 15% | 150% | 101% | 202% | 152% |
| | 30% | 198% | 102% | 254% | 161% |

As evident from Table 11, the test group 2 exhibited a higher effect on water extensibility than that of the test group 1, particularly, the effect was more remarkably found in kamaboko with 30% by weight of water added on 30-days after freezing.

EXAMPLE 3

A fresh raw meat of Alaska pollack was admixed with 8% by weight of sorbitol into a surimi. To the surimi were added 3% by weight of salt and 0, 15 or 30% by weight of water to obtain a casing kamaboko (test group 1) without using starch. Another surimi was prepared by adding to a fresh raw Alaska pollack 5% by weight of trehalose, 0.1% by weight of sodium carbonate, 0.2% by weight of an emulsifier. The surimi was admixed with 3% by weight of salt, 0, 15 or 30% by weight of water to obtain another casing kamaboko without using starch (test group 2). These kamabokos were prepared on 60- and 90-days after freezing storage of surimis, and tested for elasticity, sensory evaluation, and bending test by the method similarly as in Example 1, as well as measuring for whitening degree (L-value). The results are in Tables 12 and 13. As evident from these tables, the test group 2 with 5% by weight of trehalose, 0.1% by weight of sodium carbonate, and 0.2% by weight of an emulsifier showed a relatively-high effect of water extensibility, resulting in a frozen surimi with a relatively-high moisture content.

TABLE 12

Combination effect of trehalose and sodium carbonate on 60-days of freezer storage

| | Content of water added | | | | | |
|---|---|---|---|---|---|---|
| | 0% | | 15% | | 30% | |
| | Test group 1 | Test group 2 | Test group 1 | Test group 2 | Test group 1 | Test group 2 |
| pH | | | | | | |
| Before salting | 6.95 | 7.81 | — | — | — | — |
| After salting | 6.70 | 7.50 | — | — | — | — |
| Moisture content (%) | 73.3 | 77.1 | — | — | — | — |
| Whitening degree (L-value) | 74.6 | 71.0 | 78.3 | 74.9 | 79.8 | 78.3 |
| Elasticity $(g/cm^2)$ | 607 | 587 | 488 | 470 | 318 | 389 |
| Sensory evaluation | | | | | | |
| X | 5.0 | 5.0 | 5.0 | 5.0 | 5.0 | 4.0 |
| Y | 5.0 | 5.0 | 4.5 | 5.0 | 5.0 | 4.5 |
| Bending test | AA | AA | AA | AA | AA | AA |

Note:
The symbol "X" means "elasticity", and the symbol "Y" means "stiffness".

TABLE 13

Combination effect of trehalose and sodium carbonate on 90-days of freezer storage

| | Content of water added | | | | | |
|---|---|---|---|---|---|---|
| | 0% | | 15% | | 30% | |
| | Test group 1 | Test group 2 | Test group 1 | Test group 2 | Test group 1 | Test group 2 |
| pH | | | | | | |
| Before salting | 7.00 | 7.62 | — | — | — | — |
| After salting | 6.72 | 7.49 | — | — | — | — |
| Moisture content (%) | 73.6 | 77.4 | — | — | — | — |

TABLE 13-continued

Combination effect of trehalose and sodium carbonate on 90-days of freezer storage

| | Content of water added | | | | | |
|---|---|---|---|---|---|---|
| | 0% | | 15% | | 30% | |
| | Test group 1 | Test group 2 | Test group 1 | Test group 2 | Test group 1 | Test group 2 |
| Whitening degree (L-value) | — | — | — | — | — | — |
| Elasticity (g/cm$^2$) | 610 | 665 | 502 | 454 | 317 | 418 |
| Sensory evaluation | | | | | | |
| X | 4.7 | 4.7 | 4.5 | 4.6 | 4.6 | 4.7 |
| Y | 4.6 | 4.5 | 4.6 | 4.5 | 4.7 | 4.8 |
| Bending test | AA | AA | AA | AA | AA | AA |

Note:
The symbol "X" means "elasticity", and the symbol "Y" means "stiffness".

EXAMPLE 4

The following experiments were done to study the influence of different saccharides on their protein freezing-denaturation inhibitory effect.

Process for Preparing Frozen-Surimi

Using a leached meat of Alaska pollack, surimis were processed according to the method as indicated in Table 14 (each numerals were expressed with "% by weight"), freezed by a contact freezer overnight, and stored at −20° C.

TABLE 14

| Test group No. | |
|---|---|
| 1 | 5% Sucrose + 0.2% Phosphate |
| 2 | 5% Sorbitol + 0.1% Sodium carbonate + 0.1% Emulsifier |
| 3 | 5% Trehalose + 0.1% Sodium carbonate + 0.1% Emulsifier |
| 4 | 10% Sucrose + 0.1% Sodium carbonate + 0.1% Emulsifier |
| 5 | 10% Sorbitol + 0.1% Sodium carbonate + 0.1% Emulsifier |
| 6 | 10% Trehalose + 0.1% Sodium carbonate + 0.1% Emulsifier |
| 7 | 5% Sucrose + 5% Sorbitol + 0.1% Sodium carbonate + 0.1% Emulsifier |
| 8 | 5% Sorbitol + 5% Trehalose + 0.1% Sodium carbonate + 0.1% Emulsifier |
| 9 | 4% Sorbitol + 4% Trehalose + 0.1% Sodium carbonate + 0.1% Emulsifier |
| 10 | 8% Sucrose |

Method for Measurement of Drip When Thawed

Drip of surimi when thawed was measured on 210- and 360-days of freezer storage. The measurement was effected by placing a piece of surimi, 30 mm×30 mm×3–4 mm, 3.7–4.9 g weight, on "TOYOROSHI NO.2", a filter paper, 125 mm in diameter, commercialized by Toyo Roshi Kaisha, Ltd., Tokyo, Japan, and by weighing the drip obtained after standing at 10° C. in a refrigerator for five hours. Based on the weight measured, the weight loss percentage when thawed was calculated with the following equation:

Weight loss percentage when thawed =

$$\frac{\text{(Weight before thawing)} - \text{(Weight after thawing)}}{\text{Weight before thawing}} \times 100$$

Process for Preparing Kamaboko

Using a processed frozen surimi, a kamaboko was prepared by adding 3% by weight of salt to the surimi, kneading the mixture, adding 20% by weight of water to the kneaded mixture, injecting the resulting mixture to a casing, and boiling the injected product at 90° C. for 30 min to obtain the desired kamaboko.

Evaluation Method for Kamaboko

For processed kamabokos, they were studied on their profitability as kamabokos by measuring for gel strength using a food rheometer with a plunger of 5 mm in diameter, subjecting to sensory evaluation, and measuring for Hunter whitening degree (designated as "whitening degree (L-value)" hereinafter). These kamabokos were also examined and calculated for breaking load, breaking stress, breaking deformation, and breaking distortion factor by using the following equations. The results are in Tables 15 and 16.

Breaking Load (gf)=Load of breaking point

Breaking Stress (N/m$^2$)=[(Breaking load (gf))]×10$^{-3}$×(the acceleration of gravity)]/[(contact area (mm$^2$))]×10$^{-8}$]

Breaking Deformation (mm)=Deformation by breaking

Breaking Distortion Factor (%)=[(Breaking Deformation (mm))/(Sample size (mm))]×100

Using "CR-300", a color-difference meter commercialized by Minolta Camera Co. Ltd., Tokyo, Japan, surimis were measured for whitening degree (L-value).

TABLE 15

Evaluation of surimi on 210-days of freezer storage

| | Test group | | | | | | | | | |
|---|---|---|---|---|---|---|---|---|---|---|
| | 1 | 2 | 3 | 4 | 5 | 6 | 7 | 8 | 9 | 10 |
| Moisture content of surimi (%) | 79.6 | 80.6 | 80.5 | 77.6 | 77.3 | 77.4 | 77.6 | 78 | 79.8 | 79 |
| pH | | | | | | | | | | |
| Before salting | 7.2 | 7.78 | 7.81 | 7.97 | 7.82 | 7.93 | 7.77 | 7.72 | 7.83 | 7.04 |
| After salting | 6.87 | 7.38 | 7.4 | 7.41 | 7.45 | 7.46 | 7.44 | 7.47 | 7.41 | 6.77 |
| whitening degree (L-value) | 72.5 | 69.8 | 70.2 | 70.6 | 70.2 | 68.6 | 68.5 | 69.1 | 68.8 | 72 |
| BS | | | | | | | | | | |
| Load (gf) | 118 | 167 | 187 | 159 | 172 | 211 | 210 | 195 | 176 | 119 |
| Stress (N/m$^2$) | $5.87 \times 10^4$ | $8.32 \times 10^4$ | $9.33 \times 10^4$ | $7.95 \times 10^4$ | $8.57 \times 10^4$ | $1.06 \times 10^5$ | $1.05 \times 10^5$ | $9.72 \times 10^4$ | $8.78 \times 10^4$ | $5.96 \times 10^4$ |
| Concavity (mm) | 5.75 | 6.45 | 6.43 | 7 | 6.6 | 7.21 | 7.37 | 6.92 | 5.98 | 4.75 |
| Distortion Factor (%) | 29.3 | 33.5 | 34.1 | 36.8 | 34.5 | 38 | 38.3 | 35.8 | 31.3 | 24.8 |
| Sensory evaluation | | | | | | | | | | |
| X | 2.2 | 2.8 | 2.93 | 3.08 | 2.83 | 3.83 | 3.43 | 3.58 | 3.15 | 2 |
| Y | 2.2 | 2.68 | 2.93 | 3.08 | 2.7 | 3.7 | 3.28 | 3.33 | 3.03 | 2 |

Note:
In the table, the symbols "X", "Y", and "BS" mean "elasticity", "stiffness", and "Breaking stress", respectively.

TABLE 16

Evaluation of surimi on 360-days of freezer storage

| | Test group | | | | | | | | | |
|---|---|---|---|---|---|---|---|---|---|---|
| | 1 | 2 | 3 | 4 | 5 | 6 | 7 | 8 | 9 | 10 |
| Moisture content of surimi (%) | 79.7 | 80.1 | 79.8 | 77.3 | 76.9 | 77.1 | 77.2 | 77.3 | 79.2 | 77.9 |
| pH | | | | | | | | | | |
| Before salting | 7.26 | 8.13 | 8.19 | 8.17 | 8.03 | 8.12 | 8.12 | 8.06 | 8.1 | 7.15 |
| After salting | 4.7 | 4.94 | 3.7 | 4.65 | 3.49 | 3.78 | 3.58 | 4.75 | 4.21 | 7.45 |
| Whitening degree (L-value) | 72.6 | 67.8 | 68.4 | 69.2 | 68.7 | 68.3 | 68.6 | 69.3 | 68.5 | 71.3 |
| BS | | | | | | | | | | |
| Load (gf) | 128 | 139 | 153 | 114 | 153 | 152 | 164 | 154 | 153 | 111 |
| Concavity (mm) | 5.5 | 5.16 | 6.08 | 6 | 6.17 | 6.17 | 6.25 | 6.5 | 6.5 | 4.67 |
| Sensory evaluation | | | | | | | | | | |
| X | 2.5 | 3 | 3.25 | 3.35 | 3.5 | 3.5 | 3.55 | 3.65 | 3.65 | 1.85 |
| Y | 2.5 | 3 | 3.25 | 3.1 | 3.25 | 3.5 | 3.55 | 3.9 | 3.65 | 1.85 |
| Bending test | C | A | A | A | A | A | A | A | A | C |

Note:
In the table, the symbols "X", "Y", and "BS" mean "elasticity", "stiffness", and "Breaking stress", respectively.

As shown in Tables 15 and 16, the inhibitory effect by saccharides was observed from the sensory evaluation. When used along with sodium carbonate and emulsifier, trehalose, sorbitol and sucrose exhibited a higher freezing-denaturation inhibitory effect in the order as indicated above. The effect was distinctive at a pH of 7.5 or higher. Based on the result in the sensory evaluation, all of the saccharides tested increased the freezing-denaturation inhibitory effect depending on the concentration of saccharides. In the test group with 5% or 10% by weight of trehalose, sorbitol or sucrose exerted a higher inhibitory effect in this order as indicated as above. In the case of using saccharides in combination, the combination use of sorbitol and trehalose exerted a stronger inhibitory effect on freezing denaturation than the combination use of sorbitol and sucrose. Macroscopic observation revealed that the test groups with trehalose provided minute ice crystals and prevented the growth of ice during freezing.

EXAMPLE 5

The following preparation methods were carried out to study the freezing-denaturation inhibitory effect of a protein denaturation-inhibitory agent on freezing denaturation of a surimi of Alaska pollack manufactured on land.

Process for Preparing Frozen-Surimi

A leached fresh raw meat of Alaska pollack was mixed with, as a protein denaturation-inhibitory agent, (1) 8% by weight of sucrose (test group 1) or (2) 5% by weight of trehalose, 0.1% by weight of sodium carbonate, and 0.2% by weight of an emulsifier to obtain a surimi, followed by freezing the surimi with a contact freezer overnight and storing the freezed product at −20° C.

Evaluation Method of Surimi

The above frozen surimi was measured for moisture content on 60- and 180-days of freezer storage. The water content (% by weight) was determined by comparing the weight loss between the surimi before and after drying at 110° C. for 22 hours. While the above frozen Surimi before and after salting was measured for pH in a 10 w/w % aqueous solution thereof.

Process for Preparing Kamaboko

Using the above frozen surimi 60- or 180-days of freezer storage, 3% by weight of salt was added to the surimi, kneaded with a cutter, admixed with water in an mount of 0, 15 or 20% by weight, injected into a casing, and boiled at 90° C. for 30 min to obtain a kamaboko.

Evaluation Method of Kamaboko

For the processed kamabokos, they were evaluated on applicability for kamaboko based on the measurement of gel strength using a food rheometer with a plunger 5 mm in diameter, sensory evaluation, and whitening degree (L-value). The kamabokos were also tested for breaking load and breaking deformation similarly as the methods in Example 4, and subjected to the bending test similarly as the method in Example 4. The results are in Tables 17 and 18.

TABLE 17

Evaluation of surimi on 60-days of freezer storage

| | Test group | | | | | |
|---|---|---|---|---|---|---|
| | 1 | | | 2 | | |
| Content of water added | 0% | 15% | 30% | 0% | 15% | 30% |
| Moisture content (%) | 78.68 | — | — | 80.8 | — | — |
| pH | | | | | | |
| Before salting | 7.12 | — | — | 8.03 | — | — |
| After salting | 6.89 | 7.49 | — | 7.57 | — | — |
| Whitening degree (L-value) | 66.2 | 67.85 | 70.4 | 64.93 | 67.31 | 67.74 |
| BS | | | | | | |
| Load (gf) | 217.7 | 111 | 79.7 | 264.3 | 224.7 | 158 |
| Concavity (mm) | 4.52 | 4.45 | 4.35 | 5.82 | 6.48 | 6.55 |
| Sensory evaluation | | | | | | |
| X | 2.53 | 2.25 | 1.75 | 3.43 | 3.28 | 2.93 |
| Y | 2.53 | 2.38 | 1.88 | 3.55 | 3.28 | 2.9 |
| Bending test | B | B | B | A | A | A |

Note:
In the table, the symbols "X", "Y", and "BS" mean "elasticity", "stiffness", and "Breaking stress", respectively.

TABLE 18

Evaluation of surimi on 180-days of freezer storage

| | Test group | | | | | |
|---|---|---|---|---|---|---|
| | 1 | | | 2 | | |
| Content of water added | 0% | 15% | 30% | 0% | 15% | 30% |
| Moisture content (%) | 78.62 | — | — | 79.69 | — | — |
| pH | | | | | | |
| Before salting | 7.17 | — | — | 8.12 | — | — |
| After salting | — | — | — | — | — | — |
| Whitening degree (L-value) | 67.45 | 68.77 | 71.35 | 65.73 | 68.66 | 69.9 |
| BS | | | | | | |
| Load (gf) | 143.7 | 88 | 66.7 | 282 | 175.5 | 110.3 |
| Concavity (mm) | 4 | 3.917 | — | 5 | 5.25 | 4.75 |
| Sensory evaluation | | | | | | |
| X | 1.88 | 1.45 | 1 | 3.25 | 2.93 | 2 |
| Y | 2.25 | 1.63 | 1.18 | 3.5 | 2.75 | 1.18 |
| Bending test | C | C | C | A | B | B |

Note:
In the table, the symbols "X", "Y", and "BS" mean "elasticity", "stiffness", and "Breaking stress", respectively.

As shown in Tables 17 and 18, the test group 2 exhibited a extremely superior effect than that of the test group 1 with respect to the results in the processability of kamaboko, breaking stress, sensory evaluation, and folding test on 180-days of freezer storage. No substantial water extensibility effect was observed in the test group 1, but the test group 2 retained a satisfactory processability of kamaboko even though the content of water added was increased.

EXAMPLE 6

The following methods were done to examine the freezing-denaturation inhibitory effect of an inhibitory agent for protein denaturation on a surimi of Alaska pollack manufactured on land.

Method for Preparing Freezed-Surimi

A leached fresh raw meat of Alaska pollack was admixed with, as an inhibitory agent for protein denaturation, 8% by weight of sugar (test group 1), or 5% by weight of trehalose, 0.1% by weight of sodium carbonate, and 0.2% by weight of an emulsifier (test group 2) to obtain a surimi, followed by freezing the surimi with a contact freezer overnight and storing it at −20° C.

Evaluation Method for Surimi

For the surimis before and after freezer storage, as well as on 30-, 60-, 90-, 210-, and 360-days of freezer storage, they were measured for moisture content and pH similarly as in Example 5.

Preparation and Evaluation Method for Kamaboko

Using surimis before freezer storage and those stored for a prescribed time period, kamabokos were processed similarly as in Example 5 and evaluated. The results are in Tables 19 to 25.

TABLE 19

Evaluation of surimi before freezing

| | Content of water added | | | | | |
|---|---|---|---|---|---|---|
| | 0% | | 15% | | 30% | |
| | Test group 1 | Test group 2 | Test group 1 | Test group 2 | Test group 1 | Test group 2 |
| pH | | | | | | |
| Surimi | 7.14 | 7.91 | — | — | — | — |
| Kamaboko | 6.86 | 7.4 | 6.89 | 7.43 | 6.87 | 7.44 |
| Moisture content (%) | 75.9 | 75.9 | — | — | — | — |
| Whitening degree (L-value) | 62.8 | 62.8 | — | — | — | — |
| Breaking stress (gf) | 294 | 338 | 173 | 259 | 114 | 226 |
| Sensory evaluation | | | | | | |
| X | 5 | 5 | 4.5 | 5 | 4 | 5 |
| Y | 5 | 4.5 | 3.5 | 4 | 3 | 4 |
| Bending test | AA | AA | AA | AA | AA | AA |

Note:
The symbol "X" means "elasticity", and the symbol "Y" means "stiffness".

TABLE 20

Evaluation of surimi just after freezing

| | Content of water added | | | | | |
|---|---|---|---|---|---|---|
| | 0% | | 15% | | 30% | |
| | Test group 1 | Test group 2 | Test group 1 | Test group 2 | Test group 1 | Test group 2 |
| pH | | | | | | |
| Surimi | 7.14 | 7.91 | — | — | — | — |
| Kamaboko | 6.86 | 7.4 | 6.89 | 7.43 | 6.87 | 7.44 |
| Moisture content (%) | 75.9 | 75.9 | — | — | — | — |
| Breaking stress (gf) | 294 | 338 | 173 | 259 | 114 | 226 |
| Sensory evaluation | | | | | | |
| X | 5 | 5 | 4.5 | 5 | 4 | 5 |
| Y | 5 | 4.5 | 3.5 | 4 | 3 | 4 |
| Bending test | AA | AA | AA | AA | AA | AA |

Note:
The symbol "X" means "elasticity", and the symbol "Y" means "stiffness".

TABLE 21

Evaluation of surimi on 30-days of freezer storage

| | Content of water added | | | | | |
|---|---|---|---|---|---|---|
| | 0% | | 15% | | 30% | |
| | Test group 1 | Test group 2 | Test group 1 | Test group 2 | Test group 1 | Test group 2 |
| pH | | | | | | |
| Surimi | 7.04 | 8.25 | — | — | — | — |
| Kamaboko | 6.69 | 7.67 | — | — | — | — |
| Moisture content (%) | 74.2 | 77.5 | — | — | — | — |
| Breaking stress (gf) | 210 | 427 | 137 | 277 | 77 | 196 |
| Sensory evaluation | | | | | | |
| X | 2.5 | 5 | 2.5 | 5 | 1 | 4 |
| Y | 3.5 | 4.5 | 2.5 | 4.5 | 2 | 3 |
| Bending test | B | AA | A | AA | C | AA |

Note:
The symbol "X" means "elasticity", and the symbol "Y" means "stiffness".

TABLE 22

Evaluation of surimi on 60-days of freezer storage

| | Content of water added | | | | | |
|---|---|---|---|---|---|---|
| | 0% | | 15% | | 30% | |
| | Test group 1 | Test group 2 | Test group 1 | Test group 2 | Test group 1 | Test group 2 |
| pH | | | | | | |
| Surimi | 7.03 | 7.77 | — | — | — | — |
| Kamaboko | 6.75 | 7.46 | — | — | — | — |
| Moisture content (%) | 78.8 | 80.6 | — | — | — | — |
| Breaking stress (gf) | 242 | 351 | 151 | 229 | 105 | 169 |
| Sensory evaluation | | | | | | |
| X | 3 | 4 | 2.7 | 3.5 | 2.5 | 4 |
| Y | 3.1 | 4 | 2.6 | 3.6 | 2.5 | 4 |
| Bending test | A | AA | B | AA | B | AA |

Note:
The symbol "X" means "elasticity", and the symbol "Y" means "stiffness".

TABLE 23

Evaluation of surimi on 90-days of freezer storage

| | Content of water added | | | | | |
|---|---|---|---|---|---|---|
| | 0% | | 15% | | 30% | |
| | Test group 1 | Test group 2 | Test group 1 | Test group 2 | Test group 1 | Test group 2 |
| pH | | | | | | |
| Surimi | 7.07 | 7.74 | — | — | — | — |
| Kamaboko | 6.68 | 7.82 | — | — | — | — |
| Moisture content (%) | 78.7 | 80.7 | — | — | — | — |
| Breaking stress (gf) | 201 | 243 | 110 | 186 | 78 | 137 |
| Sensory evaluation | | | | | | |
| X | 1.5 | 3.3 | 1.2 | 2.8 | 0.8 | 2.5 |
| Y | 2.2 | 3.3 | 1.2 | 2.8 | 0.7 | 2.5 |
| Bending test | C | A | C | A | C | A |

Note:
The symbol "X" means "elasticity", and the symbol "Y" means "stiffness".

TABLE 24

Evaluation of surimi on 210-days of freezer storage

| | | pH | | Breaking stress | | Sensory evaluation | |
|---|---|---|---|---|---|---|---|
| | Moisture content (%) | Before salting | After salting | Load (gf) | Concavity (mm) | Elasticity | Stiffness |
| Test group 1 | 79 | 7.04 | 6.77 | 119 | 4.75 | 2 | 2 |
| Test group 2 | 80.5 | 7.81 | 7.4 | 187 | 6.43 | 2.93 | 2.93 |

Note:
Moisture content (%) was set to 20%.

TABLE 25

Evaluation of surimi on 360-days after freezer storage

| | | Test group 1 | Test group 2 |
|---|---|---|---|
| Water content (%) | | 77.94 | 79.77 |
| pH of surimi | | 7.15 | 8.19 |
| Weight loss of thawing | | 7.45 | 3.70 |
| Whitening degree (L-value) | | 71.31 | 68.73 |
| Breaking stress | Load (gf) | 111.0 | 152.7 |
| | Concavity (mm) | 4.67 | 6.08 |
| Sensory evaluation | Elasticity | 1.85 | 3.25 |
| | Stiffness | 1.85 | 3.25 |
| Binding test | | C | A |

Note: Moisture content (%) was set to 20%.

As shown in Tables 21 to 25, according to the test group 2, a frozen surimi, which had a relatively-high moisture content and a relatively-high water extensibility, was obtained. In the test group 1, the surimi lost its processability on 90-days of freezer storage, but the surimi in the test group 2 still kept its satisfactory processability even on 360-days of freezer storage. Thus there found an outstanding difference between the two test groups when evaluated with respect to the period of freezer storage.

EXAMPLE 7

The following methods were done to examine the freezing-denaturation inhibitory effect of an inhibitory agent for protein denaturation on a surimi of small fish.

Method for Preparing Frozen-Surimi

Seventy percent by weight of a frozen dark sleeper, 12% by weight of a raw arabesque greenling, 6% by weight of a frozen mackerel, a mixture of 12% by weight of a raw dark sleeper, deep-sea bonefish, and mullet, and an inhibitory agent for protein denaturation similarly as in Example 5 except for using 6% by weight of sucrose, (test group 1), or an inhibitory agent for protein denaturation consisting of 5% by weight of trehalose, 0.1% by weight of sodium carbonate, and 0.2% by weight of an emulsifier were mixed to obtain a surimi, followed by freezing the surimi by a contact freezer overnight and storing it at −20° C.

Evaluation Method for Surimi

For the surimis just after freezer storage, as well as on 14-days, and 2- and 4-months after freezer storage, they were measured for moisture content and pH similarly as in Example 5.

Preparation and Evaluation Method for Kamaboko

Using the surimis with different freezer storage periods, kamabokos were processed similarly as in Example 5 and evaluated. The results are in Tables 26 to 29.

TABLE 26

Evaluation of surimi just after freezer storage

|  | Test group 1 | | | Test group 2 | | |
| --- | --- | --- | --- | --- | --- | --- |
| Moisture content (%) | 79.63 | | | 79.96 | | |
| Content of water added (%) | 0 | 15 | 30 | 0 | 15 | 30 |
| pH | | | | | | |
| Before salting | 7.22 | — | — | 8.98 | — | — |
| After salting | 6.91 | — | — | 8.68 | — | — |
| ET | | | | | | |
| Load (gf) | 209 | 169 | 80 | 262 | 221 | 116 |
| Concavity (mm) | 5.02 | 5.93 | 5.53 | 5.71 | 6.18 | 4.98 |
| whitening degree (L-value) | 63.95 | 66.43 | 68.98 | 59.73 | 61.97 | 65.12 |
| Sensory evaluation | | | | | | |
| X | 3.13 | 2.43 | 1.88 | 3.55 | 3.25 | 2.25 |
| Y | 3.25 | 2.30 | 1.75 | 3.70 | 3.13 | 2.45 |
| Bending test | B | B | C | B | A | B |

Note: In the table, the symbols "X", "Y", and "ET" mean "elasticity", "stiffness", and "elasticity", respectively.

TABLE 27

Evaluation of surimi on 14-days after freezer storage

|  | Test group 1 | | | Test group 2 | | |
| --- | --- | --- | --- | --- | --- | --- |
| Content of water added (%) | 0 | 15 | 30 | 0 | 15 | 30 |
| pH | 7.32 | — | — | 9.01 | — | — |
| ET | | | | | | |
| Load (gf) | 236.3 | 138.7 | 98.7 | 301.3 | 199.7 | 147.3 |
| Deformation (mm) | 5.45 | 5.35 | 5.48 | 5.9 | 5.55 | 5.48 |
| Whitening degree (L-value) | 61.7 | 65.51 | 66.85 | 59.2 | 61 | 63.15 |

Note: In the table, the symbol "ET" means "elasticity".

TABLE 28

Evaluation of surimi on 2-months of freezer storage

| Content of | Test group 1 | | | Test group 2 | | |
| --- | --- | --- | --- | --- | --- | --- |
| water added (%) | 0 | 15 | 30 | 0 | 15 | 30 |
| Moisture content (%) | 79.25 | — | — | 79.6 | — | — |
| pH | | | | | | |
| Before salting | 7.13 | — | — | 8.96 | — | — |
| After salting | 6.9 | — | — | 8.65 | — | — |
| ET | | | | | | |
| Load (gf) | 248.3 | 127 | 92.7 | 287.7 | 200.7 | 116 |
| Concavity (mm) | 4.82 | 4.65 | 3.93 | 4.9 | 4.73 | 4.18 |
| Whitening degree (L-value) | 63.78 | 66.99 | 68.92 | 59.94 | 64.22 | — |
| Sensory evaluation | | | | | | |
| X | 2.9 | 2.4 | 1.93 | 3.3 | 3.08 | 2.4 |
| Y | 2.8 | 2.28 | 1.9 | 3.63 | 2.88 | 1.9 |
| Bending test | C | C | C | B | A | C |

Note: In the table, the symbols "X", "Y", and "ET" mean "elasticity", "stiffness", and "elasticity", respectively.

TABLE 29

Evaluation of surimi on 4-months of freezer storage

| Content of | Test group 1 | | | Test group 2 | | |
| --- | --- | --- | --- | --- | --- | --- |
| water added (%) | 0 | 15 | 30 | 0 | 15 | 30 |
| Moisture content (%) | 77.25 | — | — | 79.18 | — | — |
| pH | 7.05 | — | — | 9.01 | — | — |
| Whitening degree (L-value) | 63.87 | 65.98 | 68.8 | 60.04 | 61.64 | — |
| BS | | | | | | |
| Load (gf) | 180 | 139.7 | 89.3 | 255 | 156.7 | — |
| Concavity (mm) | 4.33 | 4.33 | 4 | 4.5 | 4.12 | — |
| Sensory evaluation | | | | | | |
| X | 2.13 | 1.68 | 1.25 | 2.38 | 1.95 | — |
| Y | 2.38 | 1.8 | 1.45 | 2.75 | 2.2 | — |
| Bending test | C | C | C | C | C | — |

Note: In the table, the symbols "X", "Y", and "BS" mean "elasticity", "stiffness", and "breaking stress", respectively.

As shown in Tables 26 to 29, the test group 2 exhibited a relatively-higher inhibitory effect on freezing denaturation of proteins than the test group 1 based on the result on 2-months of freezer storage, and had a relatively-high processibility of kamaboko.

EXAMPLE 7

The following methods were conducted to study the freezing-denaturation inhibitory effect of a protein denaturation-inhibitory agent on a surimi of white croaker.

Method for Preparing Frozen-Surimi

A fresh raw meat of white croaker was mixed with 5% by weight of trehalose, 0.1% by weight of sodium carbonate, and 0.2% by weight of an emulsifier to obtain a surimi, followed by freeze storing at −25° C.

Evaluation Method of Surimi

For the surimis before and 90-days after freezing, they were measured for moisture content and pH similarly as in Example 5.

Preparation and Evaluation Method for Kamaboko

Using surimis with different freezer storage periods, kamabokos were processed similarly as in Example 5 and evaluated. The results are in Tables 30.

TABLE 30

Evaluation of surimi on 90-days of freezer storage

|  | Test group 1 |
|---|---|
| Moisture content (%) | 77.04 |
| pH |  |
| Before salting | 7.98 |
| Kamaboko | 7.54 |
| Whitening degree (L-value) | 777.32 |
| Breaking stress |  |
| Load (gf) | 620.7 |
| Deformation (cm) | 1.17 |
| Breaking energy | 814.1 |
| Sensory evaluation |  |
| Elasticity | 4.74 |
| Stiffness | 4.88 |
| Bending test | AA |

As shown in Table 30, according to the example, an appropriate kamaboko can be processed.

EXAMPLE 8

The following methods were carried out to study the freezing-denaturation inhibitory effect of an inhibitory agent for protein denaturation on a surimi of arabesque greenling.

Method for Preparing Frozen-Surimi

A leached fresh raw meat of arabesque greenling was mixed with, as an inhibitory agent for protein denaturation, an agent consisting of 8% by weight of sucrose (test group 1); 5% by weight of sorbitol, 0.1% by weight of sodium carbonate, and 0.2% by weight of an emulsifier (test group 2); or an agent consisting of 5% by weight of trehalose, 0.1% by weight of sodium carbonate, and 0.2% by weight of an emulsifier to obtain a surimi, followed by freezing the surimi by a contact freezer overnight and storing it at –20° C.

Evaluation Method of Surimi

For the surimis before and 30-days of freezer storage, they were measured for moisture content and pH similarly as in Example 5.

Preparation and Evaluation Method for Kamaboko

Using the surimis before and 30-days of freezer storage, kamabokos were processed similarly as in Example 5 and evaluated. The results are in Tables 31 and 32.

TABLE 31

Evaluation of surimi before freezing

|  | Test group 1 | Test group 2 | Test group 3 |
|---|---|---|---|
| Moisture content (%) | 66.4 | 67.9 | 70.7 |
| pH |  |  |  |
| Before salting | 6.63 | 7.36 | 7.35 |
| After salting | 6.62 | 6.86 | 6.92 |
| Kamaboko | 6.56 | 7.11 | 7.15 |
| Whitening degree (L-value) |  |  |  |
| Surimi | 65. 5 | 60.3 | 60.7 |
| Kamaboko | 63.1 | 61.6 | 60.7 |
| Breaking stress |  |  |  |
| Load (gf) | 440.3 | 440.3 | 411.7 |
| Concavity (mm) | 4.03 | 4.08 | 3.77 |
| Sensory evaluation |  |  |  |
| Elasticity | 2.25 | 2.60 | 3.00 |
| Stiffness | 3.38 | 3.73 | 4.13 |
| Bending test | C | B | B |

TABLE 32

Evaluation of surimi on 30-days of freezer storage

|  | Test group 1 | Test group 2 | Test group 3 |
|---|---|---|---|
| Moisture content (%) | 74.28 | 75.65 | 76.09 |
| pH (before salting) | 6.49 | 7.16 | 7.19 |
| Whitening degree (L-value) | 64.58 | 64.52 | 65.42 |
| Breaking stress |  |  |  |
| Load (gf) | 355.0 | 398.2 | 445.7 |
| Deformation (mm) | 4.367 | 4.467 | 4.733 |
| Breaking energy (J/m$^3$) | 21700 | 24790 | 28860 |
| Sensory evaluation |  |  |  |
| Elasticity | 2.95 | 3.18 | 3.30 |
| Stiffness | 3.58 | 4.13 | 4.20 |
| Bending test | C | B | B |

As shown in Tables 31 and 32, a surimi with a relatively-high moisture content was obtained with the inhibitory agent for protein denaturation consisting of 5% by weight of trehalose, 0.1% by weight of sodium carbonate, and 0.2% by weight of an emulsifier as in the test group 3. On 30-days of freezer storage, the surimi with the inhibitory agent in the test group 3 less denatured proteins than that of the test group 1 with 8% by weight of sucrose, and had a relatively-higher processibility of kamaboko. The surimi processed with arabesque greenling in this example less changed pH than the surimi processed with Alaska pollack in Example 5.

EXAMPLE 9

The following methods were done to study the freezing-denaturation inhibitory effect of an inhibitory agent for protein denaturation on a minced chicken and pork.

Method for Preparing Minced Meat

Using a commercially available minced chicken or pork produced in Japan, the following three types of minced meats were prepared by: providing intact minced chicken or pork (test group 1), mixing the minced meat with 5% by weight of sucrose (test group 2), and mixing the minced meat with 5% by weight of trehalose, 0.1% by weight of sodium carbonate, and 0.2% by weight of an emulsifier (test group 3). Each of the resulting mixtures as the test groups 1 to 3 were respectively mixed with "QUICK MASTER", a mixer, for 25 sec; shaped with a plastic petri-dish, 90 mm in diameter and 10 mm in depth; wrapping the shaped products; and freeze-storing the wrapped products by a freezer at –20° C.

Evaluation Method for Minced Meat (1) For the frozen minced meats on 1- and 26-days of freezer storage, they were measured for moisture content (%). The moisture content (%) was calculated in comparison with the weight loss of the minced meats before and after drying at 110° C. for 20 hours.
(2) The pH of minced meats was measured by diluting 10-times with distilled water.
(3) The weight of drips from the minced meats was determined by placing the frozen products in a putty form on two-folded "TOYOROSHI NO.2", a filter paper, 125 mm in diameter, commercialized by Toyo Roshi Kaisha, Ltd., Tokyo, Japan; and weighing the products before thawing and after thawing in a refrigerator kept at 10° C. for two hours. Based on the weights measured, weight loss of thawing was calculated with the equation of:

Weight loss of thawing=[{(Weight before thawing)–(Weight after thawing)}/(Weight before thawing)]×100

(4) To study the heat shrinkage, using a hot plate, frozen minced meats were heated in such a manner that they were successively heated inside and outside of them at 200° C. for one minute for each side in a twice cyclic manner (four minutes in total). Based on the weights measured, weight loss percentage by heating was calculated with the equation of:

Weight loss percentage (%) by heating=[{(Weight before heating)–(Weight after heating)}/(Weight before heating)]×100

(5) The sensory evaluation of frozen minced meats was conducted on juiciness and stiffness.
These results are in Tables 33 and 34.

TABLE 33

Evaluation of minced meat on 1-day of freezer storage

|  | pH | Drip | | | | Change on heating | | | |
|---|---|---|---|---|---|---|---|---|---|
|  |  | A | B | C | D | A | B | C | D |
| MC |  |  |  |  |  |  |  |  |  |
| Test group 1 | 6.51 | 52.6 | 50.2 | 2.4 | 4.6 | — | — | — | — |
| Test group 2 | 6.51 | 54.65 | 52.06 | 2.59 | 4.7 | — | — | — | — |
| Test group 3 | 7.09 | 51.29 | 49.77 | 1.52 | 3 | — | — | — | — |
| MP |  |  |  |  |  |  |  |  |  |
| Test group 1 | 6 | 58.84 | 53.47 | 5.37 | 9.1 | 53.74 | 41.08 | 12.39 | 23.2 |
| Test group 2 | 6.06 | 56.36 | 52.94 | 3.42 | 6.1 | 52.94 | 44.5 | 8.44 | 15.9 |

TABLE 33-continued

Evaluation of minced meat on 1-day of freezer storage

|  | pH | Drip | | | | Change on heating | | | |
|---|---|---|---|---|---|---|---|---|---|
|  |  | A | B | C | D | A | B | C | D |
| Test group 3 | 6.98 | 56.35 | 55.74 | 0.61 | 1.1 | 55.74 | 49.76 | 5.98 | 10.7 |

Note:
The symbols "A", "B", "C" and "D" mean "weight before freezing (g)", "weight after freezing (g)", "weight difference (g)", and "weight loss percentage (%)". The symbols "MC" and "MP" mean "minced chicken" and "minced pork".

TABLE 34

Evaluation of minced meat on 26-days of freezer storage

|  | Drip | | | | Change on heating | | | |
|---|---|---|---|---|---|---|---|---|
|  | A | B | C | D | A | B | C | D |
| MC |  |  |  |  |  |  |  |  |
| Test group 1 | 57.01 | 53.33 | 3.68 | 6.6 | — | — | — | — |
| Test group 2 | 54.11 | 50 | 4.11 | 7.6 | — | — | — | — |
| Test group 3 | 51.41 | 49.68 | 1.73 | 3.4 | — | — | — | — |
| MP |  |  |  |  |  |  |  |  |
| Test group 1 | 56.86 | 52.25 | 4.61 | 8.1 | 52.25 | 41.91 | 10.34 | 19.8 |
| Test group 2 | 57.31 | 52.25 | 4.79 | 8.4 | 52.52 | 43.63 | 8.89 | 16.9 |
| Test group 3 | 60.9 | 59.86 | 1.04 | 1.7 | 59.86 | 53.6 | 6.26 | 10.5 |

Note:
The symbols "A", "B", "C" and "D" mean "weight before freezing (g)", "weight after freezing (g)", "weight difference (g)", and "weight loss percentage (%)". The symbols "MC" and "MP" mean "minced chicken" and "minced pork".

As shown in Tables 33 and 34, the pHs of minced chicken and pork in the test group 3 with 5% by weight of trehalose, 0.1% by weight of sodium carbonate, and 0.2% by weight of an emulsifier, increased by 0.5 and about 1.0, respectively, as compared with those in the test group 1. Thus, the pH increased depending on the minced meat tested. In the test group 3, the drip of the minced chicken and pork after thawing were prevented, particularly, the effect was clear cut in the minced pork. The heat shrinkage of minced pork in the test group 3 was lesser than those in the test groups 1 and 2.

EXAMPLE 10

The following methods were carried out to study the freezing-denaturation inhibitory effect of an inhibitory agent on a ham.

Method for Preparing Minced Meat

A lump of ham produced in Japan was minced by a chopper into 3 mm slices which were then admixed with an agent consisting of 0.093% by weight of sodium carbonate (test group 1); 0.185% by weight of sodium carbonate (test group 2); an agent consisting of 5% by weight of trehalose, 0.1% by weight of sodium carbonate, and 0.2% by weight of an emulsifier (test group 3); an agent consisting of 5% by weight of trehalose, 0.193% by weight of sodium carbonate, 0.2% by weight of an emulsifier (test group 4); or an agent consisting of 5% by weight of sorbitol, 0.1% by weight of sodium carbonate, and 0.2% by weight of an emulsifier (test group 5); or admixed with nothing (test group 6), followed by homogeneous mixing. The resulting mixtures were mixed on a "COCK MASTER", a mixer, for 30 sec (10 sec×3 times), shaped by placing in plastic petri-dishes, 90 mm in diameter and 10 mm in depth, wrapped, and freezed for storing at −20° C.

Evaluation Method for Minced Meat

Frozen minced meats before and 3-days after freezing were evaluated similarly as in Example 10 except that the drip was measured by placing a frozen minced meat in a putty form on a two-folded "TOYOROSHI NO.2", a filter paper, 125 mm in diameter, commercialized by Toyo Roshi Kaisha, Ltd., Tokyo, Japan; and measuring the weight before freezing, and after freezing for three hours in a 10° C. freezer. The evaluation results are in Tables 35 to 38. The moisture content was 75% by weight.

TABLE 35

Result on pH measurement

| Test group | 1 | 2 | 3 | 4 | 5 | 6 |
|---|---|---|---|---|---|---|
| pH | 6.1 | 6.44 | 6.22 | 6.5 | 6.17 | 5.86 |

TABLE 36

Weight change on heating of a frozen minced meat in a putty form before freezing, stored at 5° C. until measurement

| Test group | 1 | 2 | 3 | 4 | 5 | 6 |
|---|---|---|---|---|---|---|
| Weight before heating (g) | 50.07 | 50.39 | 50.09 | 50.43 | 50.36 | 50.59 |
| Weight after heating (g) | 42.43 | 45.49 | 43.48 | 46.23 | 43.49 | 39.55 |
| Weight difference (g) | 7.46 | 4.9 | 6.61 | 4.2 | 6.87 | 11.04 |
| Weight loss percentage by heating (%) | 15.3 | 9.7 | 13.2 | 8.3 | 13.6 | 21.8 |

TABLE 37

Drip after thawing on 3-days of freezer storage

| Test group | 1 | 2 | 3 | 4 | 5 | 6 |
|---|---|---|---|---|---|---|
| Weight before heating (g) | 50.14 | 49.93 | 49.79 | 50.03 | 50.03 | 49.89 |
| Weight after heating (g) | 46.99 | 47.95 | 48.27 | 49.54 | 47.93 | 45.09 |
| Weight difference (g) | 3.15 | 2.03 | 1.52 | 0.91 | 2.1 | 4.8 |
| Weight loss percentage by heating (%) | 6.3 | 4.1 | 3.1 | 1.8 | 4.2 | 9.6 |

TABLE 38

Weight change on heating of a thawed minced meat in a putty from

| Test group | 1 | 2 | 3 | 4 | 5 | 6 |
|---|---|---|---|---|---|---|
| Weight before heating (g) | 46.99 | 47.95 | 48.27 | 49.54 | 47.93 | 45.09 |

TABLE 38-continued

Weight change on heating of a thawed minced meat in a putty from

| Test group | 1 | 2 | 3 | 4 | 5 | 6 |
|---|---|---|---|---|---|---|
| Weight after heating (g) | 38.94 | 42.73 | 40.92 | 44.54 | 40.86 | 34.93 |
| Weight difference (g) | 8.05 | 5.22 | 7.35 | 4.2 | 7.07 | 10.16 |
| weight loss percentage by heating (%) | 17.1 | 10.9 | 15.3 | 8.3 | 14.8 | 22.5 |

As shown in Tables 35 to 38, both the minced meats in the test groups 3 and 4 with trehalose and sodium carbonate lowered the heat shrinkage and the drip both before freezing and after 3-days of freezer storage that those in the test groups 1 and 2. Based on the comparison of test groups 3 and 4, the higher the pH of minced meat with trehalose and sodium carbonate, the more effectively lower the heat shrinkage and the drip of minced meat. The minced meat with trehalose rather less changed in weight both before freezing and 3-days of freezer storage than that processed with sorbitol from the results in the test group 3 and test group 5 with sorbitol in place of trehalose.

EXAMPLE 11

In this example, a fried kamaboko, intact kamaboko, and fish sausage were processed using a frozen surimi containing an inhibitory agent for protein denaturation.

Method for Preparing Frozen-Surimi

A leached fresh raw meat of Alaska pollack was processed into a surimi by mixing with, as an inhibitory agent for protein denaturation, an agent consisting of 8% by weight of sucrose (test group 1); or an agent consisting of 5% by weight of trehalose, 0.1% by weight of sodium carbonate, and 0.2% by weight of an emulsifier (test group 2), followed by freezing the resultant surimi using a contact freezer overnight, and storing it at −20° C. for 120 days.

Process for Preparing Fried-Kamaboko

Using the above frozen surimi on 120-days after freezing, it was kneaded by a cutter with the ingredients as listed in Table 39, shaped into a rounded clump, and fried on a frier at 170° C. into a fried kamaboko.

TABLE 39

Standard prescription

| | Test group 1 | | Test group 2 | |
|---|---|---|---|---|
| | Content (kg) | Percentage (%) | Content (kg) | Percentage (%) |
| Frozen surimi | 1.500 | 61.03 | 1.500 | 58.99 |
| Salt | 0.045 | 1.83 | 0.045 | 1.77 |
| Sucrose | 0.045 | 1.83 | 0.130 | 5.11 |
| Starch | 0.150 | 6.10 | 0.150 | 5.90 |
| Plant protein | 0.030 | 1.22 | 0.030 | 1.18 |
| Mixed seasoning | 0.018 | 0.73 | 0.018 | 0.71 |
| Extract of fisheries | 0.040 | 1.63 | 0.040 | 1.57 |
| Fermented seasoning | 0.040 | 1.63 | 0.040 | 1.57 |
| Plant oil | 0.030 | 1.22 | 0.030 | 1.18 |
| Xylose | 0.007 | 0.28 | 0.007 | 0.28 |
| Glucose | 0.009 | 0.37 | 0.009 | 0.35 |

TABLE 39-continued

|  | Standard prescription | | | |
|---|---|---|---|---|
|  | Test group 1 | | Test group 2 | |
|  | Content (kg) | Percentage (%) | Content (kg) | Percentage (%) |
| Water added | 0.540 | 21.97 | 0.540 | 21.23 |
| Transglutaminase (TG) preparation | 0.004 | 0.16 | 0.004 | 0.16 |
| Total | 2.458 | 100.00 | 2.543 | 100.00 |

Evaluation Method for Fried Kamaboko

Fried kamabokos were evaluated for elasticity and stiffness by 5-point test by expert panels, and further evaluated by one-pair comparison test by 10 non-expert panels. The results are in Table 40.

TABLE 40

Evaluation result of fried kamaboko

|  | pH | | Sensory test (5-point test) | | One-pair comparison test | |
|---|---|---|---|---|---|---|
|  | A | B | X | Y | X | Y |
| Test group 1 | 7.27 | 6.75 | 3.55 | 3.33 | 4 | 2 |
| Test group 2 | 8.11 | 7.41 | 3.25 | 3.53 | 6 | 8 |

Note: The symbols "A", "B", "X" and "Y" mean "before salting", "after salting", "elasticity" and "stiffness".

As shown in Table 40, the fried kamaboko in the test group 2 gave a satisfactory sensory evaluation result with respect to elasticity and stiffness. One-pair comparison test revealed that the fried kamaboko in the test group 2 had a preferable preference than that in the test group 1.

Process for Preparing Casing Kamaboko

Using the above frozen surimi on 120-days of freezer storage, it was kneaded by a cutter with the ingredients as listed in Table 39, injected into casings in such a manner that unstable kneaded products were instantly injected into casings, while stable ones were injected into casings after allowed to stand at 37° C. for 60 min, and boiled at 90° C. for 30 min to obtain casing kamabokos.

Evaluation Method for Casing Kamaboko

Casing kamabokos were evaluated for elasticity and stiffness by 5-point test by expert panels, and further evaluated by one-pair comparison test by 10 non-expert panels. The kamabokos were examined for profitability as kamabokos by measuring for whitening degree (L-value) and for gel strength using a food rheometer with a plunger of 5 mm in diameter. The results are in Table 41.

TABLE 41

Evaluation result of casing kamaboko

|  | Test group 1 | | | | Test group 2 | | | |
|---|---|---|---|---|---|---|---|---|
|  | Before salting | After salting | Setting (No) | Setting (Yes) | Before salting | After salting | Setting (No) | Setting (Yes) |
| pH | 7.27 | 6.75 | — | — | 8.11 | 7.41 | — | — |
| Breaking stress |  |  |  |  |  |  |  |  |
| Load (gf) | — | — | 322.7 | 322.7 | — | — | 275 | 336 |
| Concavity (mm) | — | — | 6.78 | 7.25 | — | — | 6.53 | 7.03 |
| Whitening degree (L-value) | — | — | 62.36 | 65.52 | — | — | 64.48 | 65.52 |
| Sensory evaluation |  |  |  |  |  |  |  |  |
| Elasticity | — | — | 2.5 | 3 | — | — | 3.5 | 3.75 |
| Stiffness | — | — | 2.5 | 3 | — | — | 3 | 3.5 |
| One-pair comparison test |  |  |  |  |  |  |  |  |
| Elasticity | — | — | 3 | 2 | — | — | 7 | 8 |
| Stiffness | — | — | 3 | 2 | — | — | 7 | 8 |

As shown in Table 41, the casing kamaboko in the test group 2 gave a high score with respect to elasticity and stiffness than that in the test group 1. The result was more clear cut in the case of using TG preparation, meaning that the casing kamaboko in the test group 2 has a relatively-low freezing-denaturation percentage of protein for actomyosin, and has a higher stability than that in the test group 1.

Process for Preparing Kamaboko Attached to Plate

Using the above frozen kamaboko on 120-days of freezer storage, it was kneaded by a cutter with the ingredients as listed in Table 42, attached to a plate, and boiled at 90° C. for 30 min to obtain a kamaboko attached to the plate.

TABLE 42

|  | Standard prescription | | | |
|---|---|---|---|---|
|  | Test group 1 | | Test group 2 | |
|  | Content (kg) | Percentage (%) | Content (kg) | Percentage (%) |
| Frozen surimi | 1.500 | 68.49 | 1.500 | 67.48 |
| Salt | 0.045 | 2.05 | 0.045 | 2.02 |
| Sucrose | 0.017 | 0.78 | 0.050 | 2.25 |
| Starch | 0.120 | 5.48 | 0.120 | 5.40 |
| Plant protein | 0.030 | 1.37 | 0.030 | 1.35 |
| Mixed seasoning | 0.018 | 0.82 | 0.018 | 0.81 |
| Extract of fisheries | 0.040 | 1.83 | 0.040 | 1.80 |
| Fermented seasoning | 0.040 | 1.83 | 0.040 | 1.80 |
| Plant oil | 0.030 | 1.37 | 0.030 | 1.35 |
| Water added | 0.350 | 15.98 | 0.350 | 15.74 |
| Total | 2.190 | 100.00 | 2.223 | 100.00 |

Evaluation Method for Kamaboko Attached to Plate

Kamabokos attached to plates were evaluated for elasticity and stiffness by 5-point test by expert panels, and further evaluated by one-pair comparison test by 10 non-expert panels. The results are in Table 43.

TABLE 43

| Evaluation result of kamaboko attached to plate | | | | | | |
|---|---|---|---|---|---|---|
|  | pH | | Sensory test (5-point test) | | One-pair comparison test | |
|  | A | B | X | Y | X | Y |
| Test group 1 | 7.23 | 6.72 | 3.3 | 3.15 | 3 | 2 |
| Test group 2 | 8.02 | 7.38 | 3.8 | 4.0 | 7 | 8 |

Note: The symbols "A", "B", "X" and "Y" mean "before salting", "after salting", "elasticity" and "stiffness", respectively.

As shown in Table 43, even a kamaboko attached to a plate gave a similar result as the above fried- and casing-kamabokos in the test groups.

Process for Preparing Fish Sausage

Using the above frozen surimi on 120-days of freezer storage, it was kneaded by a cutter with the ingredients as listed in Table 44, attached to a plate, and boiled at 90° C. for 30 min to obtain a kamaboko attached to the plate.

TABLE 44

|  | Standard prescription | | | |
|---|---|---|---|---|
|  | Test group 1 | | Test group 2 | |
|  | Content (kg) | Percentage (%) | Content (kg) | Percentage (%) |
| Frozen surimi | 1.000 | 27.84 | 1.000 | 27.62 |
| Mackerel | 0.100 | 2.78 | 0.100 | 2.76 |
| Lard | 0.250 | 6.96 | 0.250 | 6.91 |
| Plant oil | 0.300 | 8.35 | 0.300 | 8.29 |
| Starch | 0.400 | 11.14 | 0.400 | 11.05 |
| Gelatin | 0.400 | 11.14 | 0.400 | 11.05 |
| Wheat protein | 0.150 | 4.18 | 0.150 | 4.14 |
| Soy bean protein | 0.050 | 1.39 | 0.050 | 1.38 |
| Onion | 0.070 | 1.95 | 0.070 | 1.93 |
| Salt | 0.055 | 1.53 | 0.055 | 1.52 |
| Sucrose | 0.017 | 0.47 | 0.045 | 1.24 |
| Egg white | 0.020 | 0.56 | 0.020 | 0.55 |
| Seasoning | 0.060 | 1.67 | 0.060 | 1.66 |
| Pork extract | 0.006 | 1.67 | 0.006 | 0.17 |
| Color | 0.010 | 0.28 | 0.010 | 0.28 |
| Spice | 0.004 | 0.11 | 0.004 | 0.11 |
| Water Added | 0.700 | 19.49 | 0.700 | 19.34 |
| Total | 3.592 | 100.00 | 3.620 | 100.00 |

Evaluation Method for Fish Sausage

Fish sausages were evaluated for elasticity and stiffness by 5-point test by expert panels, and further evaluated by one-pair comparison test by 10 non-expert panels. For storing test, the fish sausages were stored at 37° C. and macroscopically observed for storing stability. The results are in Table 45.

TABLE 45

| Evaluation result of fish sausage | | | | | |
|---|---|---|---|---|---|
|  | pH | | One-pair Comparison test | | Preservation result |
|  | Before salting | After salting | Elasticity | Stiffness | Preserved at 37° C. |
| Test group 1 | 7.15 | 7.00 | 4 | 3 | 4 days |
| Test group 2 | 7.35 | 7.15 | 6 | 7 | 4 days |

As shown in Table 45, even in the case of the fish sausage, the one in the group 2 gave a superior elasticity, stiffness, and preservation result to that in the test group 1.

EXAMPLE 12

A leached fresh raw meat of Alaska pollack was processed with the ingredients as listed in Table 46 into surimis, freezed by a contact freezer overnight, and stored at −20° C.

TABLE 46

| List of additives | | | | |
|---|---|---|---|---|
| Test group | 1 | 2 | 3 | 4 |
| Sucrose | 5% | — | — | 8% |
| Sorbitol | — | 5% | — | — |
| Trehalose | — | — | 5% | — |
| Poly- and pyro-Phosphates | 0.2% | — | — | — |
| Sodium carbonate | — | 0.1% | 0.1% | — |
| Sucrose fatty acid ester | — | 0.1% | 0.1% | — |

To observe the texture of the above surimis, specimens thereof were prepared by the following procedures (1) to (7):
(1) Freezing surimis as materials at −20° C., placing the freezed surimis in an ice-cooled pure-alcohol for thawing, fixing, and dehydrating;
(2) Processing the dehydrated products into pieces of surimis, 3 mm in thickness, and then fixing the pieces with pure alcohol and dehydrating them;

(3) Subjecting the dehydrated products to xylene penetration and paraffine embedding, and then slicing them into slices, 4 μm in thickness, by a microtome;
(4) Extending the slices over slide glasses before drying;
(5) Removing paraffin with xylene from the specimens on slide glasses, and saturating the specimens with water while decreasing the concentration of alcohol;
(6) Treating the resulting specimens with hematoxylin, and then subjecting the resultants to eosine staining, alcohol dehydration, xylene penetration, and resin inclusion; and
(7) Observing the specimens thus obtained on a phase contrast microscope, and photographing them. FIG. 1 shows visualized images of the texture of the frozen surimis.

As shown in FIG. 1, the texture of each specimen of surimis was well retained. The surimis processed with Alaska pollack were apparently differed in textures depending on their preparations with sucrose, sorbitol and trehalose. While the surimis processed with small fishes did not substantially show a significant difference except for the formation of minute ice-crystals in the surimis with trehalose. In the specimens of Alaska pollack, those with sucrose in the test group 4 had a substantially longitudinally- or horizontally-square ice-crystal, and a fishing net-like protein fiber; those with 8% by weight of sucrose in the test group 4 had thinner fibers than those with 5% by weight of sucrose, meaning that the former tended to have more ice crystals. The surimi specimen with sorbitol in the test group 2 had minute ice crystals and was appeared to be a foamy-like product having a random direction of texture and the thinnest protein fibers among any other specimens. The surimi specimen in the test group 3 had the thickest protein fibers among which minute ice crystals, having a rather directional texture but with no regularity, were found. Evaluation of these surimi specimens revealed that the one with trehalose in the test group 3 had the highest content of protein fibers per square.

As described above, the present inhibitory agent for protein denaturation; kneaded meat with suppressed freezing-denaturation and process thereof; method for freezer storage for meat paste product; and a process for producing fish and meat paste products, especially, kamabokos, and fish sausages attain a relatively-high denaturation-inhibitory effect on frozen kneaded meat in general including frozen fish surimis and on the protein denaturation thereof accompanied by freezing without using phosphate. The foods free of phosphate and with suppressed freezing-denaturation according to the present invention effectively inhibit the protein denaturation by a large margin without using phosphate. Therefore, the present foods well correspond to users' minds which dislike foods with phosphates. Particularly, the drip-inhibitory agent and the method for increasing the product yield according to the present invention effectively inhibit the drip of kneaded meat and increase the yield thereof. According to the present inhibitory agent for sponge formation induced by freezing, the spongy-meat-formation of kneaded meat is effectively inhibited. The present agent and the present method for enhancing the stability formation of fish surimi increase the desired enhancing effect and improve the quality of fish and meat paste products. Also the present fish and meat paste products and the process thereof effectively exert a satisfactory denaturation-inhibitory effect on frozen kneaded meat of poultry and animals and effectively inhibit the protein denaturation accompanied by freezing without using any phosphate.

While there has been described what is at present considered to be the preferred embodiments of the invention, it will be understood the various modifications may be made therein, and it is intended to cover the appended claims all such modifications as fall within the true spirits and scope of the invention.

We claim:

1. An alkaline food-product composition for inhibiting the protein denaturation, inhibiting the drip or sponge formation, or enhancing the stability formation of a kneaded meat selected from the group consisting of a fish meat, poultry meat, or other animal meat, said composition consisting essentially of:
    (a) one or more members selected from the group consisting of sorbitol, trehalose, and another saccharide containing sorbitol and/or trehalose; and
    (b) a pH-controlling agent consisting essentially of an alkaline compound for adjusting the pH of said fish meat, poultry meat, or other animal meat to an alkaline pH by mixing said composition with said kneaded meat.

2. The composition according to claim 1 wherein said pH-controlling agent is selected from the group consisting of sodium carbonate, potassium carbonate and a mixture thereof.

3. The composition according to claim 1, wherein the amount of said pH-controlling agent is from 0.05% by weight to 10-times by weight of the total amount of said sorbitol, trehalose, and another saccharide.

4. The composition according to claim 1, wherein said saccharide is a member selected from the group consisting of reducing and non-reducing sugars.

5. The composition according to claim 4, wherein said reducing and non-reducing sugars are selected from the group consisting of glucose, maltose, lactose, fructose, sucrose, raffinose, mannitol, lactitol and maltitol.

6. The composition according to claim 1, wherein said pH-controlling agent is a member selected from the group consisting of organic- and inorganic-carbonate salts.

7. The composition of claim 1 wherein the saccharide is a sugar alcohol.

8. An alkaline food product composition for inhibiting the protein denaturation, inhibiting the drip or sponge formation, or enhancing the stability formation of a kneaded meat selected from the group consisting of a fish meat, poultry meat, or other animal meat, said composition consisting essentially of:
    (a) one or more members selected from the group consisting of sorbitol, trehalose, and another saccharide containing sorbitol and/or trehalose;
    (b) a pH-controlling agent consisting essentially of an alkaline compound for adjusting the pH of said fish meat, poultry meat, or other animal meat to an alkaline pH by mixing said composition with said kneaded meat; and
    (c) an emulsifier.

9. The composition according to claim 8 wherein said pH-controlling agent is selected from the group consisting of sodium carbonate, potassium carbonate and a mixture thereof.

10. The composition according to claim 8, wherein the amount of said pH-controlling agent is from 0.05% by weight to 10-times by weight of the total amount of said sorbitol, trehalose, and another saccharide.

11. The composition according to claim 8, wherein said saccharide is a member selected from the group consisting of reducing and non-reducing sugars.

12. The composition according to claim 11, wherein said reducing and non-reducing sugars are selected from the group consisting of glucose, maltose, lactose, fructose, sucrose, raffinose, mannitol, lactitol and maltitol.

13. The composition according to claim 8, wherein said pH-controlling agent is a member selected from the group consisting of organic- and inorganic-carbonate salts.

14. The composition of claim 8, wherein the saccharide is a sugar alcohol.

15. The composition according to claim 8, wherein the amount of said emulsifier is from 10% by weight to 10-times by weight of the amount of said pH-controlling agent.

16. An alkaline food product composition for inhibiting the protein denaturation, inhibiting the drip or sponge formation, or enhancing the stability formation of a kneaded meat selected from the group consisting of a fish meat, poultry meat, or other animal meat, said composition consisting essentially of:

(a) one or more members selected from the group consisting of sorbitol, trehalose, and another saccharide containing sorbitol and/or trehalose;

(b) a pH-controlling agent consisting essentially of an alkaline compound for adjusting the pH of said fish meat, poultry meat, or other animal meat to an alkaline pH by mixing said composition with said kneaded meat; and (c) a glycoside sweetener.

17. The composition according to claim 16, wherein said pH-controlling agent is selected from the group consisting of sodium carbonate, potassium carbonate and a mixture thereof.

18. The composition according to claim 16, wherein the amount of said pH-controlling agent is from 0.05% by weight to 10-times by weight of the total amount of said sorbitol, trehalose, and another saccharide.

19. The composition according to claim 16, wherein said saccharide is a member selected from the group consisting of reducing and non-reducing sugars.

20. The composition according to claim 19, wherein said reducing and non-reducing sugars are selected from the group consisting of glucose, maltose, lactose, fructose, sucrose, raffinose, mannitol, lactitol and maltitol.

21. The composition according to claim 16, wherein said pH-controlling agent is a member selected from the group consisting of organic- and inorganic-carbonate salts.

22. The composition of claim 16, wherein the saccharide is a sugar alcohol.

23. An alkaline food product composition for inhibiting the protein denaturation, inhibiting the drip or sponge formation, or enhancing the stability formation of a kneaded meat selected from the group consisting of a fish meat, poultry meat, or other animal meat, said composition consisting essentially of:

(a) one or more members selected from the group consisting of sorbitol, trehalose, and another saccharide containing sorbitol and/or trehalose;

(b) a pH-controlling agent consisting essentially of an alkaline compound for adjusting the pH of said fish meat, poultry meat, or other animal meat to an alkaline pH by mixing said composition with said kneaded meat;

(c) an emulsifier; and (d) a glycoside sweetener.

24. The composition according to claim 23, wherein said pH-controlling agent is selected from the group consisting of sodium carbonate, potassium carbonate and a mixture thereof.

25. The composition according to claim 23, wherein the amount of said pH-controlling agent is from 0.05% by weight to 10-times by weight of the total amount of said sorbitol, trehalose, and another saccharide.

26. The composition according to claim 23, wherein said saccharide is a member selected from the group consisting of reducing and non-reducing sugars.

27. The composition according to claim 26, wherein said reducing and non-reducing sugars are selected from the group consisting of glucose, maltose, lactose, fructose, sucrose, raffinose, mannitol, lactitol and maltitol.

28. The composition according to claim 23, wherein said pH-controlling agent is a member selected from the group consisting of organic- and inorganic-carbonate salts.

29. The composition of claim 23, wherein the saccharide is a sugar alcohol.

30. The composition according to claim 23, wherein the amount of said emulsifier is from 10% by weight to 10-times by weight of the amount of said pH-controlling agent.

* * * * *